(12) United States Patent
Ito et al.

(10) Patent No.: US 8,482,182 B2
(45) Date of Patent: Jul. 9, 2013

(54) DRIVING APPARATUS, OPTICAL APPARATUS, AND DRIVING SIGNAL CONTROL CIRCUIT

(75) Inventors: Hisao Ito, Saitama (JP); Hideo Yoshida, Saitama (JP); Takezo Nagamitsu, Saitama (JP); Tetsuya Tokoro, Oizumi-machi (JP); Yukihiko Sigeoka, Oizumi-machi (JP)

(73) Assignees: FUJIFILM Corporation, Tokyo (JP); Sanyo Semiconductor Co., Ltd., Gunma (JP); Sanyo Electric Co., Ltd., Moriguchi-Shi (JP)

( * ) Notice: Subject to any disclaimer, the term of this patent is extended or adjusted under 35 U.S.C. 154(b) by 523 days.

(21) Appl. No.: 12/754,271

(22) Filed: Apr. 5, 2010

(65) Prior Publication Data

US 2010/0270954 A1 Oct. 28, 2010

(30) Foreign Application Priority Data

Apr. 24, 2009 (JP) ................................ P2009-106485

(51) Int. Cl.
*H01L 41/00* (2006.01)
(52) U.S. Cl.
USPC ............................ 310/311; 310/315; 318/116
(58) Field of Classification Search
USPC .......... 310/311, 315, 316.01, 316.03, 323.17; 318/116–118
See application file for complete search history.

(56) References Cited

U.S. PATENT DOCUMENTS

| 5,917,267 | A | | 6/1999 | Miyazawa et al. | |
|---|---|---|---|---|---|
| 6,114,799 | A | * | 9/2000 | Yoshida et al. | 310/328 |
| 6,140,750 | A | * | 10/2000 | Ueyama | 310/369 |
| 6,147,434 | A | * | 11/2000 | Nakano et al. | 310/317 |
| 6,717,329 | B2 | * | 4/2004 | Yoshida et al. | 310/316.02 |
| 2004/0251778 | A1 | * | 12/2004 | Hoshino | 310/317 |
| 2007/0115568 | A1 | | 5/2007 | Akiba et al. | |
| 2008/0203950 | A1 | * | 8/2008 | Yoshida | 318/116 |
| 2009/0026886 | A1 | * | 1/2009 | Yoshida et al. | 310/328 |

FOREIGN PATENT DOCUMENTS

| CN | 1980036 A | 6/2007 |
|---|---|---|
| CN | 101401290 A | 4/2009 |
| JP | 3358418 B2 | 10/2002 |

OTHER PUBLICATIONS

Chinese Office Action for application No. 201010166426.6, dated Dec. 13, 2012.

* cited by examiner

*Primary Examiner* — Rina Duda
(74) *Attorney, Agent, or Firm* — Birch, Stewart, Kolasch & Birch, LLP

(57) ABSTRACT

A driving apparatus includes a piezoelectric element which undergoes expansion/contraction motion by a driving signal; a driving shaft which is mounted on the piezoelectric element, and undergoes reciprocating movement according to the expansion/contraction motion of the piezoelectric element; a first movement member which is friction-engaged with the driving shaft, and moves due to the reciprocating movement of the driving shaft; and a first control portion which applies driving signals to the piezoelectric element; the first control portion applies driving control pulse signals when the first movement member is to be moved, and applies stop control pulse signals when the stopped first movement member is not to be moved to put the first movement member into a vibration-arrested state. By this means, the stopped first movement member can be smoothly moved, and the first movement member in motion can be smoothly stopped.

19 Claims, 18 Drawing Sheets

Fig.15
(A)
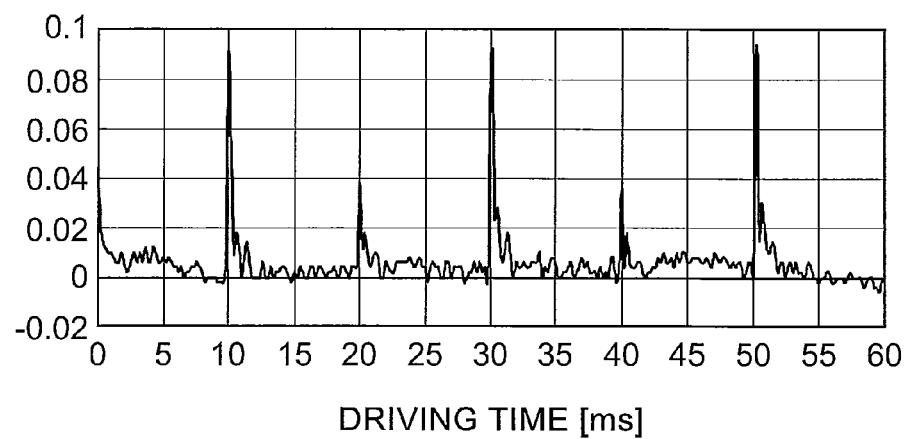
(B)
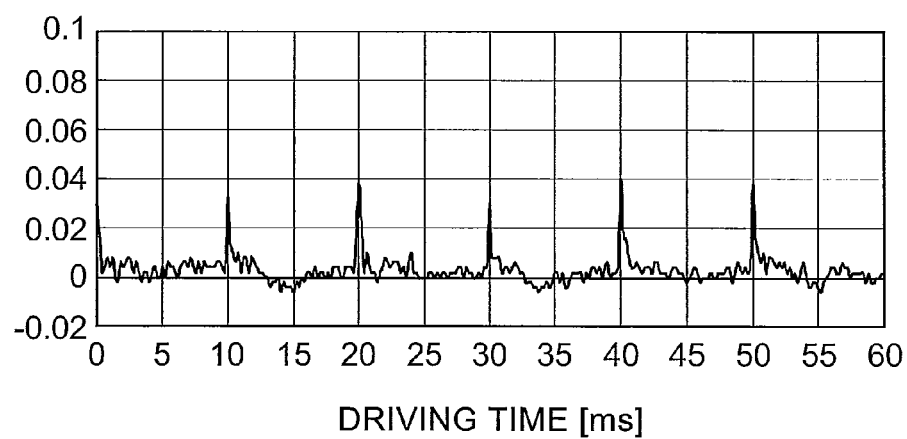

Fig.16
(A)
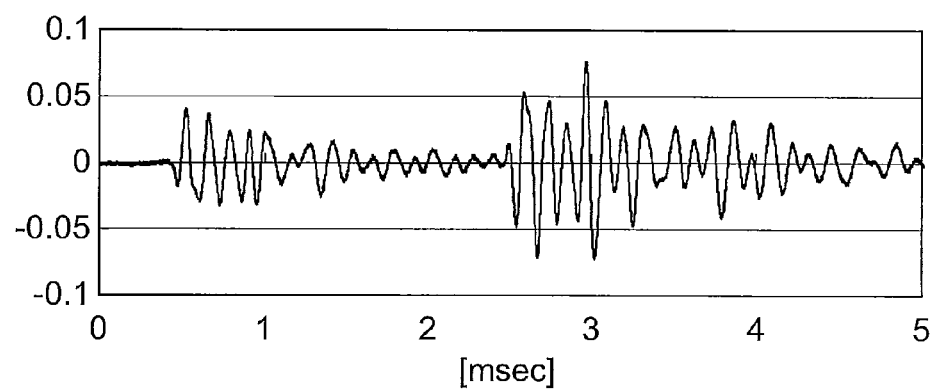
(B)
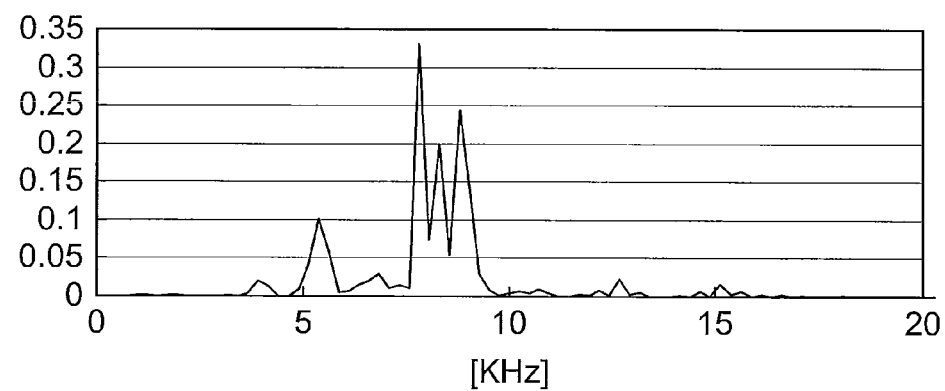

Fig.17
(A)
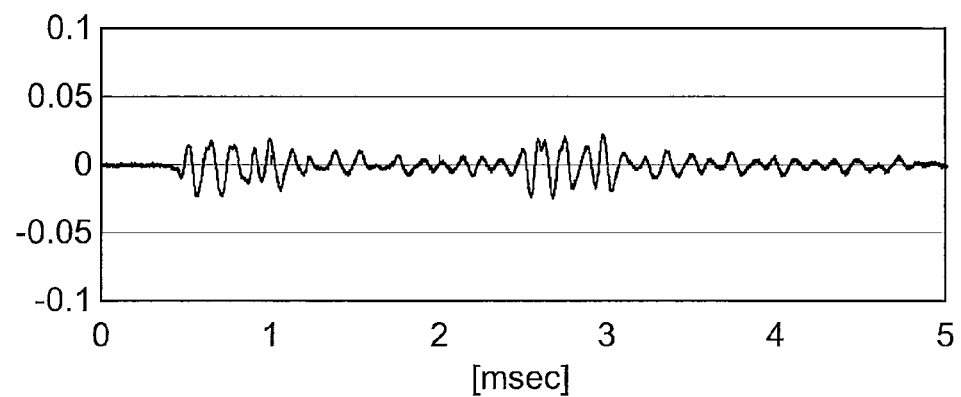
(B)
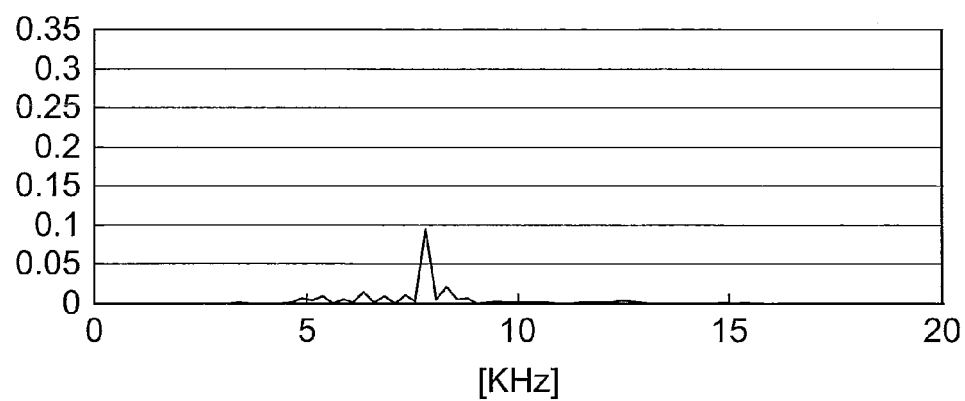

Fig.18
(A)
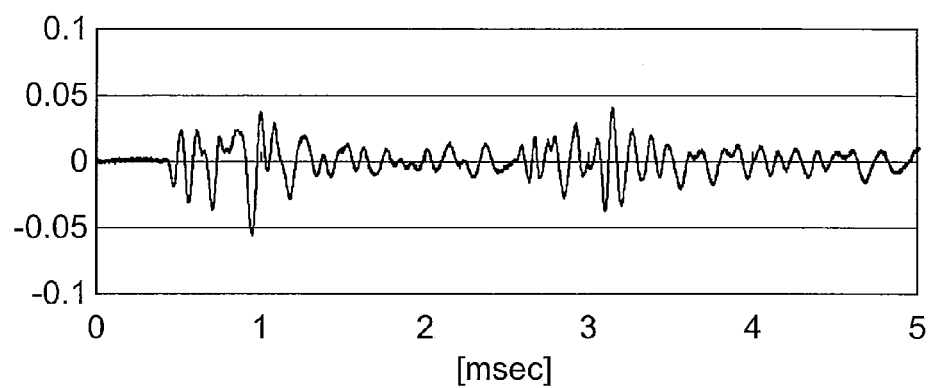
(B)
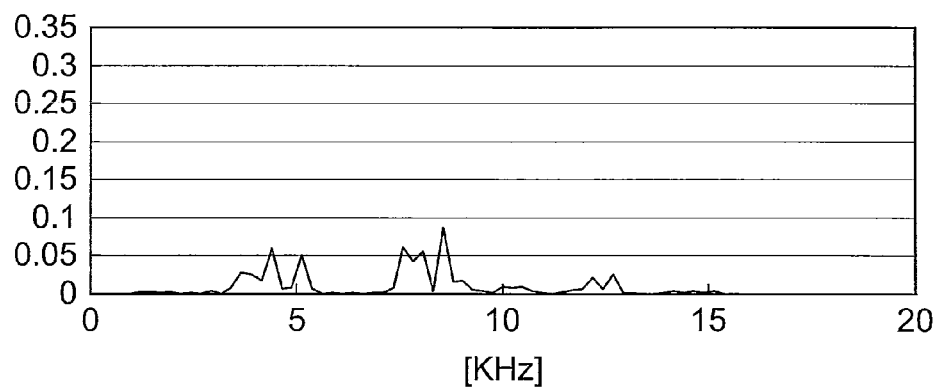

DRIVING APPARATUS, OPTICAL APPARATUS, AND DRIVING SIGNAL CONTROL CIRCUIT

CROSS-REFERENCE TO RELATED APPLICATIONS

The disclosure of Japanese Patent Application No. JP2009-106485 filed on Apr. 24, 2009 including the specification, drawings and abstract is incorporated herein by reference in its entirety.

BACKGROUND OF THE INVENTION

1. Field of the Invention

This invention relates to a driving apparatus which causes a driven member to be driven, and to an optical apparatus comprising such a driving apparatus, as well as to a driving signal control circuit used in such a driving apparatus.

2. Related Background Art

As a driving apparatus of the prior art, a driving apparatus is known which comprises an actuator having a piezoelectric element (electromechanical transducing element) which expands and contracts by a driving signal, and which outputs driving signals to this actuator to control the velocity of motion of a driven member (see for example Japanese Patent No. 3358418). At the time driving is started, the driving apparatus disclosed in this patent reference gradually causes the time over which driving pulse signals are applied to the piezoelectric element to be increased, and controls the electric charge applied to the piezoelectric element, executing control such that the driving velocity gradually increases, and, at the time driving is stopped, gradually causes the time over which driving pulse signals are applied to the piezoelectric element to be decreased, and controls the electric charge applied to the piezoelectric element, executing control such that the driving velocity gradually decreases.

SUMMARY OF THE INVENTION

However, the driving apparatus disclosed in Japanese Patent No. 3358418 must perform control to gradually change the pulse width or applied voltage of driving pulse signals, in order to reduce the operation noise of the driving apparatus. Consequently there are concerns that control in order to reduce operation noise may be complex.

This invention was devised in order to resolve these technical problems, and has as an object the provision of a driving apparatus, optical apparatus, and driving signal control circuit which are capable of reducing operation noise through simple driving.

That is, a driving apparatus according to an aspect of this invention comprises an electromechanical transducing element which undergoes expansion/contraction motion by a driving signal; a driving shaft which is mounted on the electromechanical transducing element, and undergoes reciprocating movement according to the expansion/contraction motion of the electromechanical transducing element; a driven member which is friction-engaged with the driving shaft, and moves due to the reciprocating movement of the driving shaft; and a driving signal control circuit which applies the driving signal to the electromechanical transducing element; the driving signal control circuit is characterized in applying a first driving signal when the driven member is to be moved, and in applying a second driving signal when the driven member is not to be moved to put the driven member into a vibration-arrested state.

Even when the stationary driven member is not to be moved, a driving apparatus according to an aspect of this invention applies the second driving signal to the electromechanical transducing element, putting the driven member into a vibration-arrested state. By means of this configuration, the friction engagement between the driving shaft and the driven member which is not moving can be weakened, so that the stationary driven member can be moved smoothly, and the driven member in motion can be stopped smoothly. Hence when the driven member is not moved, operation noise can be reduced through simple control in which the second driving signal is applied, without controlling the pulse width of the driving signal.

Here, the second driving signal may be a signal for which an interval from a forward-direction charging timing to a reverse-direction charging timing of the electromechanical transducing element, and an interval from the reverse-direction charging timing to the next forward-direction charging timing, be the same. By means of such a configuration, when the driven member is not moved, the second signal can be applied to cause only the driving shaft to vibrate, with substantially no movement of the driven member, so that friction engagement between the driving shaft and the driven member while the driven member is stationary can be weakened. Hence operation noise can be reduced through simple control.

Further, the first driving signal may be a signal comprising a first pulse signal and a second pulse signal, and that the second driving signal be a signal comprising the first pulse signal and a pulse signal obtained by delaying the second pulse signal by a time equal to substantially half the period of the first pulse signal. By means of this configuration, the second driving signal can be generated simply by controlling the time lag of the first pulse signal and second pulse signal of the first driving signal, so that operation noise can be reduced through still more simple control.

Further, the driving signal control circuit may apply the second driving signal for a prescribed interval immediately before the driven member is moved, and for a prescribed interval immediately after the driven member has been moved. By means of this configuration, operation noise can be efficiently eliminated.

Further, the driving signal control circuit may apply the second driving signal such that the number of pulses of the second driving signal applied in the prescribed interval immediately after the driven member has been moved is greater than the number of pulses of the second driving signal applied in the prescribed interval immediately before the driven member is moved. By means of this configuration, operation noise can be efficiently eliminated.

Further, the driving signal control circuit may apply the second driving signal only in the prescribed interval immediately after the driven member has been moved. By means of this configuration, operation noise can be effectively and efficiently eliminated.

An optical apparatus according to an aspect of this invention comprises an above-described driving apparatus, and is characterized in that an optical element is linked with the driven member, and in that vibration prevention control is performed in which the optical element is moved in a direction perpendicular to an optical axis direction. By means of this optical apparatus, because an above-described driving apparatus is comprised, operation noise can be reduced.

Further, a driving signal control circuit according to an aspect of this invention is a driving signal control circuit which applies a driving signal to an electromechanical transducing element that undergoes expansion/contraction motion by the driving signal, and which comprises a pulse generation circuit which generates a first driving signal applied when the driven member is to be moved, and a second driving signal applied when the driven member is not to be moved; and is characterized in that the second driving signal is a signal for which an interval from a forward-direction charging timing to a reverse-direction charging timing of the electromechanical transducing element, and an interval from the reverse-direction charging timing to the next forward-direction charging timing, are the same.

A driving signal control circuit according to an aspect of this invention employs a pulse generation circuit to generate a second driving signal which puts the driven member into a vibration-arrested state, and applies the second driving signal to the electromechanical transducing element to put the driven member into the vibration-arrested state even when the stopped driven member is not to be moved. By means of this configuration, the friction engagement between the driving shaft and the stationary driven member can be weakened, so that the stationary driven member can be moved smoothly, and the driven member in motion can be stopped smoothly. Hence when the driven member is not moved, operation noise can be reduced through simple control in which the second driving signal is applied, without controlling the pulse width of the driving signal.

By means of this invention, operation noise can be reduced through simple control.

BRIEF DESCRIPTION OF THE DRAWINGS

FIG. 15 shows measured results for operation noise in Practical Example 1 and Comparative Example 1;

FIG. 16 shows details of measured results for operation noise in Comparative Example 2;

FIG. 17 shows details of measured results for operation noise in Practical Example 2; and FIG. 18 shows details of measured results for operation noise in Practical Example 3.

DESCRIPTION OF THE PREFERRED EMBODIMENTS

Figure 1:
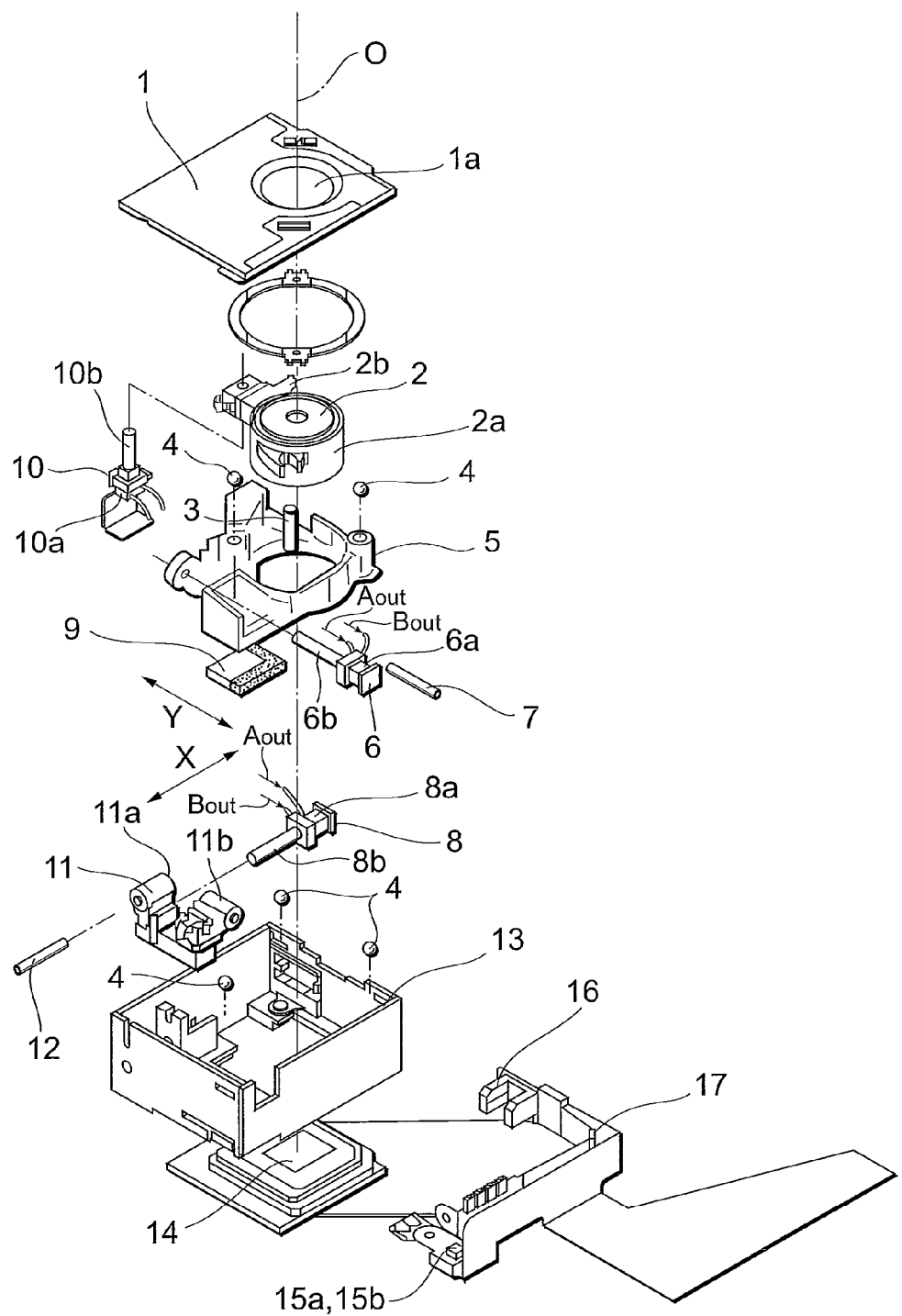
FIG. 1 is an exploded perspective view of an image capture portion and shake correction mechanism in the image capture apparatuses of first to third embodiments.

Below, embodiments of the invention are explained referring to the attached drawings. In the drawings, the same symbols are assigned to the same or to equivalent portions, and redundant explanations are omitted.

First Embodiment

An image capture apparatus (optical apparatus) comprising the driving apparatus of the first embodiment, for example, causes relative motion of an image capture optical system and image capture element in directions perpendicular to the optical axis direction to perform shake correction (vibration prevention). That is, the image capture optical system is moved according to shaking, and the relative position with the optical element is changed to correct for shaking. This image capture apparatus is employed in a camera which captures still images, a video camera which captures videos, an image capture portion installed in a portable telephone set, and similar.

First, the mechanical configuration of an image capture apparatus comprising the driving apparatus of this embodiment is explained. FIG. 1 is an exploded perspective view of the image capture portion and shake correction mechanism in an image capture apparatus comprising the driving apparatus of the first embodiment. As shown in FIG. 1, the image capture apparatus comprising the driving apparatus of this embodiment comprises an image capture optical system (optical element) 2 to obtain an image of the subject, and an image capture element 14. The image capture optical system 2 is an optical system which condenses light on the image capture element 14, and comprises an image capture lens. This image capture optical system 2 is for example configured as a lens (not shown) housed in a holder 2a. The image capture optical system 2 may comprise a single lens, or may comprise a lens group of a plurality of lenses.

The image capture optical system 2 is mounted on the second movement member 5, and is provided so as to enable motion, relative to the image sensor element 14, in a direction perpendicular to the direction of the optical axis O (optical axis direction). The second movement member 5 is housed within an image capture element holder 13 which fixes in place the image capture element 14, and is supported by a spherical body 4, and so is cable of motion relative to the image capture element holder 13 and image capture element 14 in a direction perpendicular to the optical axis direction. As a result, the image capture optical system 2, by moving together with the second movement member 5, moves relative to the image capture element 14 in a direction perpendicular to the optical axis direction.

At this time, it is preferable that the image capture optical system 2 be mounted on the second movement member 5 so as to enable movement in the optical axis direction. For example, a support shaft 3 is mounted on the second movement member 5 in the optical axis direction, and the image capture optical system 2 is mounted to enable movement along the support shaft 3. As an actuator 10 to move the image capture optical system 2 in the optical axis direction, a driving shaft 10b, which undergoes reciprocating movement due to expansion and contract of a piezoelectric element 10a, is used. This actuator 10 functions as a third actuator which moves the image capture optical system 2 in the optical axis direction. The piezoelectric element 10a is mounted on the second movement member 5, and the driving shaft 10b is friction-engaged with the image capture optical system 2. One end of the driving shaft 10b abuts the piezoelectric element 10a, and for example is bonded using an adhesive. The driving shaft 10b is a long member, and may for example be cylindrical in shape.

As the friction engagement structure, for example, a structure is employed in which the driving shaft 10b is pressed against the holder 2a of the image capture optical system 2 with a constant pressing force by a leaf spring, and when the driving shaft 10b moves, a constant friction force occurs. When the driving shaft 10b moves so as to exceed this friction force, inertia causes the position of the image capture optical system 2 to be maintained. On the other hand, when the driving shaft 10b moves in the reverse direction so as not to exceed this friction force, the image capture optical system 2 also moves in the reverse direction. By repeating such reciprocating movement of the driving shaft 10b, the image capture optical system 2 can be made to move relative to the second movement member 5. Electrical signals causing different expansion velocities and contraction velocities are input from a control portion (not shown) to the piezoelectric element 10a. By this means, the driving shaft 10b undergoes reciprocating movement at different velocities, and motion control of the image capture optical system 2 can be performed.

By thus mounting the image capture optical system 2 so as to enable movement in the optical axis direction relative to the second movement member 5, the image capture optical system 2 alone can be moved in the optical axis direction relative to the second movement member 5, and focusing can be performed.

The image capture element 14 is image capture means which converts an image focused by the image capture optical system 2 into electrical signals, and is fixed and mounted on the image capture element holder 13. As this image capture element 14, for example a CCD sensor is used.

Further, an image capture apparatus of this embodiment comprises a first actuator 8 and a second actuator 6. The first actuator 8 is an actuator which causes relative motion of the image capture optical system 2 and image capture element 14 in the yaw direction X perpendicular to the optical axis. This first actuator 8 comprises, for example, a driving shaft 8b which undergoes reciprocating movement due to expansion and contraction of a piezoelectric element (electromechanical transducing element) 8a. The driving shaft 8b is positioned in the yaw direction X. The piezoelectric element 8a is mounted on the image capture element holder 13 on which the image capture element 14 is fixed. The driving shaft 8b is friction-engaged with the first movement member (driven member) 11. One end of the driving shaft 8b abuts the piezoelectric element 8a, and is for example bonded using an adhesive. The driving shaft 8b is a long member, and may for example be cylindrical in shape.

As the friction engagement structure, for example, a structure is employed in which the driving shaft 8b is pressed against the first movement member 11 with a constant pressing force by a leaf spring, and when the driving shaft 8b moves, a constant friction force occurs. When the driving shaft 8b moves so as to exceed this friction force, inertia causes the position of the first movement member 11 to be maintained. On the other hand, when the driving shaft 8b moves in the reverse direction so as not to exceed this friction force, the first movement member 11 also moves in the reverse direction. By repeating such reciprocating movement of the driving shaft 8b, the first movement member 11 can be made to move relative to the image capture element 14 along the yaw direction X, and the image capture optical system 2 can be made to move relative to the image capture element 14 in the yaw direction X. Electrical signals causing different expansion velocities and contraction velocities are input from a control portion to the piezoelectric element 8a. By this means, the driving shaft 8b undergoes reciprocating movement at different velocities, and motion control of the image capture optical system 2 can be performed.

A configuration of the first actuator 8 is also possible in which the piezoelectric element 8a is mounted on the first movement member 11, and the driving shaft 8b is caused to be friction-engaged with the image capture element holder 13.

The second actuator 6 is an actuator which causes relative motion of the image capture optical system 2 and the image capture element 14 in the pitch direction Y perpendicular to the optical axis direction. The second actuator 6 and first actuator 8 function as driving means (a driving apparatus) to cause relative motion of the image capture optical system 2 and image capture element 14.

The pitch direction Y is set to be perpendicular to the optical axis direction and intersecting the yaw direction X. The second actuator 6 comprises for example a driving shaft 6b which undergoes reciprocating movement through expansion and contraction of a piezoelectric element (electromechanical transducing element) 6a. The driving shaft 6b is positioned in the pitch direction Y. The piezoelectric element 6a is mounted on the second movement member 5. The driving shaft 6b is friction-engaged with the first movement member 11. One end of the driving shaft 6b abuts the piezoelectric element 6a, and is for example bonded using an adhesive. The driving shaft 6b is a long member, and may for example be cylindrical in shape.

As the friction engagement structure, for example, a structure is employed in which the driving shaft 6b is pressed against the first movement member 11 with a constant pressing force by a leaf spring, and when the driving shaft 6b moves, a constant friction force occurs. When the driving shaft 6b moves so as to exceed this friction force, inertia causes the position of the second movement member 5 to be maintained. On the other hand, when the driving shaft 6b tries to move in the reverse direction so as not to exceed this friction force, the driving shaft 6b remains stationary due to the friction force, and the second movement member 5 moves in one direction. By repeating such reciprocating movement of the driving shaft 6b, the second movement member 5 can be made to move relative to the image capture element 14 along the pitch direction Y, and the image capture optical system 2 can be made to move relative to the image capture element 14 in the pitch direction Y. Electrical signals causing different expansion velocities and contraction velocities are input from a control portion, described below, to the piezoelectric element 6a. By this means, the driving shaft 6b undergoes reciprocating movement at different velocities, and motion control of the image capture optical system 2 can be performed.

The second actuator 6 is mounted on the first movement member 11 by means of the above-described friction engagement. Consequently, through movement in the yaw direction X of the first movement member 11 due to action of the first actuator 8, the second actuator 6 also moves in the yaw direction X.

A configuration of the second actuator 6 is also possible in which the piezoelectric element 6a is mounted on the first movement member 11, and the driving shaft 6b is caused to be friction-engaged with the second movement member 5.

A position detection magnet 9 and Hall elements 15a, 15b are provided in the image capture apparatus. The position detection magnet 9 is a magnet mounted on the second movement member 5, and need only generate a magnetic field of adequate strength to enable detection by the Hall elements 15a and 15b. The Hall elements 15a, 15b are magnetic sensors which detect the relative positions of the image capture element 14 and image capture optical system 2 in directions perpendicular to the optical axis direction, based on the state of the magnetic field generated by the position detection magnet 9, and are for example mounted on the board 17. The Hall elements 15a, 15b are devices enabling detection of the relative positions in directions perpendicular to the optical axis direction. The board 17 is a wiring board mounted on the image capture element holder 13; for example, a board bent into an L shape is used. On this board 17 are mounted leads for the piezoelectric elements 6a, 8a, 10a.

A photointerruptor 16 is provided in the image capture apparatus. The photointerruptor 16 is a position detection sensor which performs position detection of the image capture optical system 2. The photointerruptor 16 is mounted on the board 17, and is arranged in a position close to the image capture optical system 2. The photointerruptor 16 comprises a light-emitting portion and a light-receiving portion, and detects the position in the optical axis direction of the image capture optical system 2 through detection of the position of the movement piece 2b which passes between the light-emitting portion and the light-receiving portion. The movement piece 2b is formed on the holder 2a of the image capture optical system 2, and is a member which moves integrally with the image capture optical system 2.

The image capture apparatus comprises an upper cover 1. The upper cover 1 is a cover which covers the opening portion of the image capture element holder 13 accommodating the image capture portion and the shake correction mechanism, and has formed an opening portion 1a for incidence of the subject image.

The first movement member 11 is supported by a first support shaft 12 so as to enable movement along the yaw direction X. The first support shaft 12 is a shaft member positioned in the yaw direction X, and is mounted on the image capture element holder 13. The first support shaft 12 is provided penetrating the shaft bearing portion 11a of the first movement member 11. By this means, the first movement member 11 is supported by the first support shaft 12 so as to enable movement relative to the image capture element 14 only in the yaw direction X.

The second movement member 5 is supported by a second support shaft 7 so as to enable movement along the pitch direction Y. The second support shaft 7 is a shaft member positioned in the pitch direction Y, and is mounted on the second movement member 5. The second support shaft 7 is provided penetrating the shaft bearing portion 11b of the first movement member 11. By this means, the second movement member 5 is supported by the second support shaft 7 so as to enable movement relative to the first movement member 11 only in the pitch direction Y.

Figure 2:
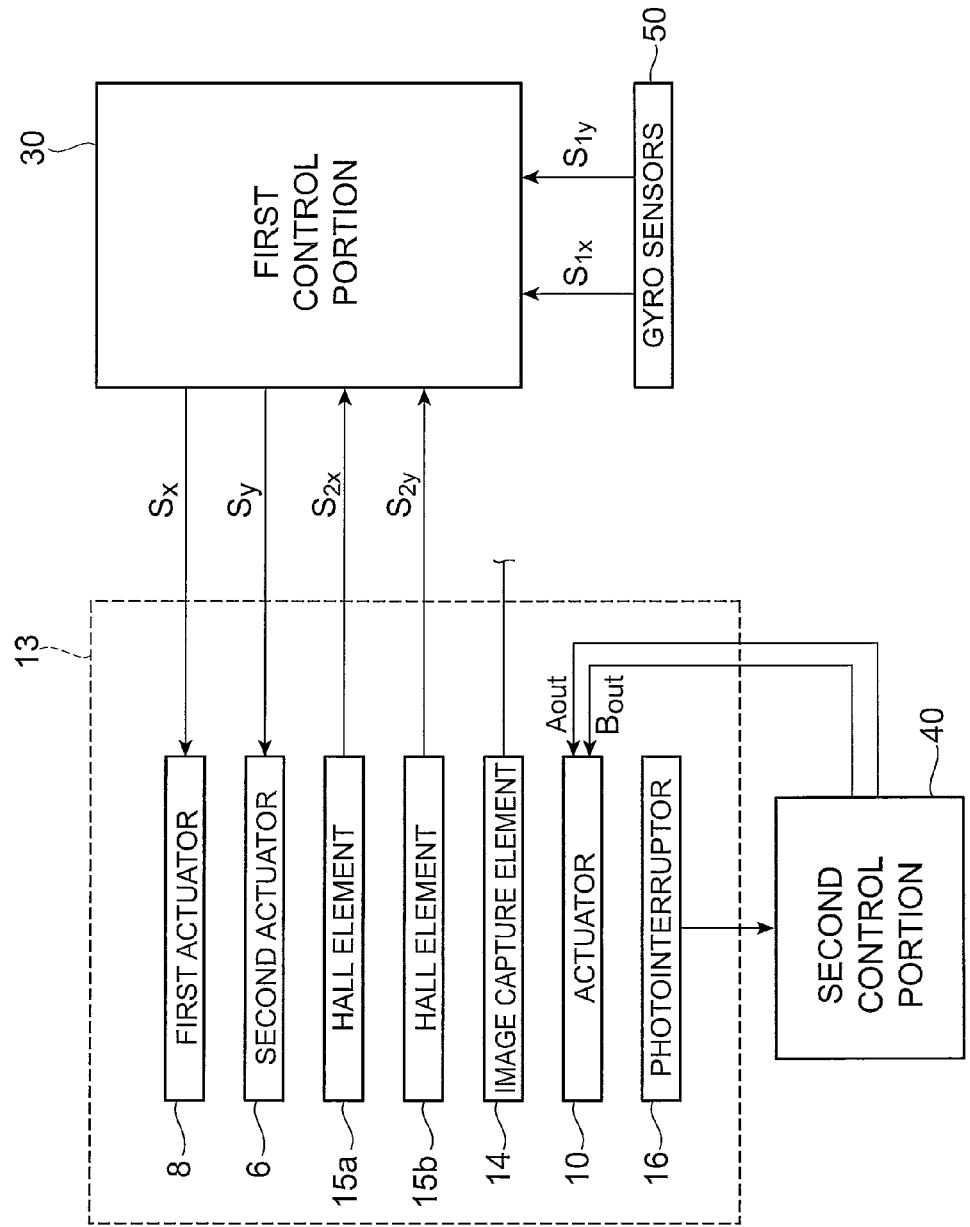
FIG. 2 is a block diagram showing the electrical configuration of the image capture apparatuses of the first to third embodiments.

Next, the electrical configuration of the image capture apparatus of this embodiment is explained. FIG. 2 is a block diagram showing the electrical configuration of the image capture apparatus of this embodiment.

As shown in FIG. 2, the image capture apparatus of this embodiment comprises a first control portion (driving signal control circuit) 30. The first control portion 30 functions as control means which controls relative motion of the image capture optical system 2 and image capture element 14 in directions perpendicular to the optical axis direction, to perform shake correction. The first control portion 30 comprises, for example, a CPU, LSI (Large Scale Integration) chip comprising a driver chip, and similar; details are described below. Gyro sensors 50 connected to the first control portion 30 function as shake detection sensors which detect the amount of shaking. The gyro sensors 50 are positioned outside the vibration prevention unit, that is, outside the image capture element holder 13.

The first control portion 30 takes as inputs the detection signal S1x of a gyro sensor 50 and the detection signal S2x of the Hall element 15a, and outputs a driving signal Sx to the first actuator 8. The detection signal S1x of a gyro sensor 50 is a detection signal relating to the amount of shaking in the yaw direction X (X direction). The detection signal S2x of the Hall element 15a is a detection signal relating to the relative position of the image capture element 14 and image capture optical system 2 in the yaw direction X.

The first control portion 30 takes as inputs the detection signal S1y of a gyro sensor 50 and the detection signal S2y of the Hall element 15b, and outputs a driving signal Sy to the second actuator 6. The detection signal S1y of a gyro sensor 50 is a detection signal relating to the amount of shaking in the pitch direction Y (Y direction). The detection signal S2y of the Hall element 15b is a detection signal relating to the relative position of the image capture element 14 and image capture optical system 2 in the pitch direction Y.

A second control portion 40 connected to the third actuator 10 functions as control means to control movement of the image capture optical system 2 in the optical axis direction. The second control portion 40 comprises, for example, an autofocus IC, microcomputer, and similar. The second control portion 40 acquires information on the distance to the subject from a distance measurement device, not shown, and based on this distance information and the detection signal of the photointerruptor 16, outputs a driving signal to the actuator 10 to control movement of the image capture optical system 2.

Figure 3:
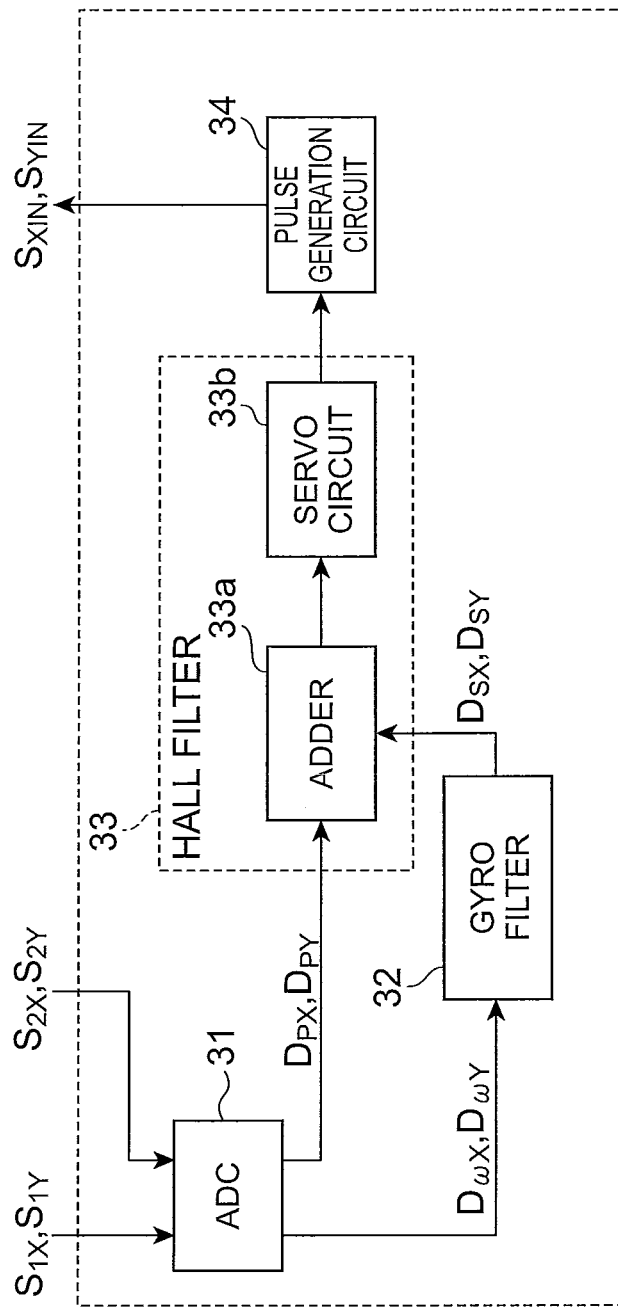
FIG. 3 is a summary diagram of the shake correction circuit of the first control portion shown in FIG. 2.

Next, the function of the first control portion 30 to generate shake correction signals is explained. FIG. 3 is a summary diagram of the shake correction circuit of the image capture apparatus of this embodiment. The first control portion 30 comprises a shake correction circuit 60 and drivers 61, 62, explained below.

The shake correction circuit 60 comprises an A/D converter (ADC, Analog-to-Digital Converter) 31, Hall filter 33, gyro filter 32, and pulse generation circuit 34. The circuit portion 4 comprises a logic circuit, such as for example an ASIC (Application-Specific Integrated Circuit). The ADC 31 takes as inputs the output signals of the Hall elements 15a, 15b and the gyro sensors 50. The ADC 31 converts the detection signals S2x, S2y output by the two Hall elements 15a, 15b and the detection signals S1x, S1y output by the two gyro sensors 50, into digital data DPX, DPY, DωX, DωY by time division.

The position data DPX, DPY generated based on the outputs of the Hall elements 15a, 15b are input to the Hall filter 33. On the other hand, the angular velocity data DωX, DωY generated based on the outputs of the gyro sensors 50 are input to the gyro filter 32.

The gyro filter 32 performs integration of the angular velocities DωX, DωY input over a prescribed sampling interval, and generates data according to the camera rocking angles about the x axis and y axis. The gyro filter 32 generates and outputs vibration amount data DSX, DSY according to the amounts of shaking in the x direction and y direction, based on data corresponding to the generated rocking angles.

The Hall filter 33 has an adder 33a and a servo circuit 33b. The adder 33a adds the position data DPX, DPY input from the ADC 31 to the vibration amount data DSX, DSY from the gyro filter 32 separately for each of the x and y directions. The servo circuit 33b calculates servo data, which are the required displacement amounts of the lens 8, from the data output from the adder 33a.

The pulse generation circuit 34 generates pulses SxIN, SyIN to drive the piezoelectric elements 8a, 6a based on servo data output from the Hall filter 33. The generated pulses SxIN, SyIN are amplified to voltages sufficient to drive the piezoelectric elements 8a, 6a by the drivers 61, 62, and are applied to the piezoelectric elements 8a, 6a. The pulse generation circuit 34 generates pulses SxIN, SyIN such that the image capture optical system 2 is driven in a direction so that the absolute values of the servo data are decreased. By this means, during image-capture period, the image capture optical system 2 is moved according to camera shaking, displacement of the subject image on the image capture element due to this shaking is compensated, and high-quality image signals can be obtained.

Figure 4:
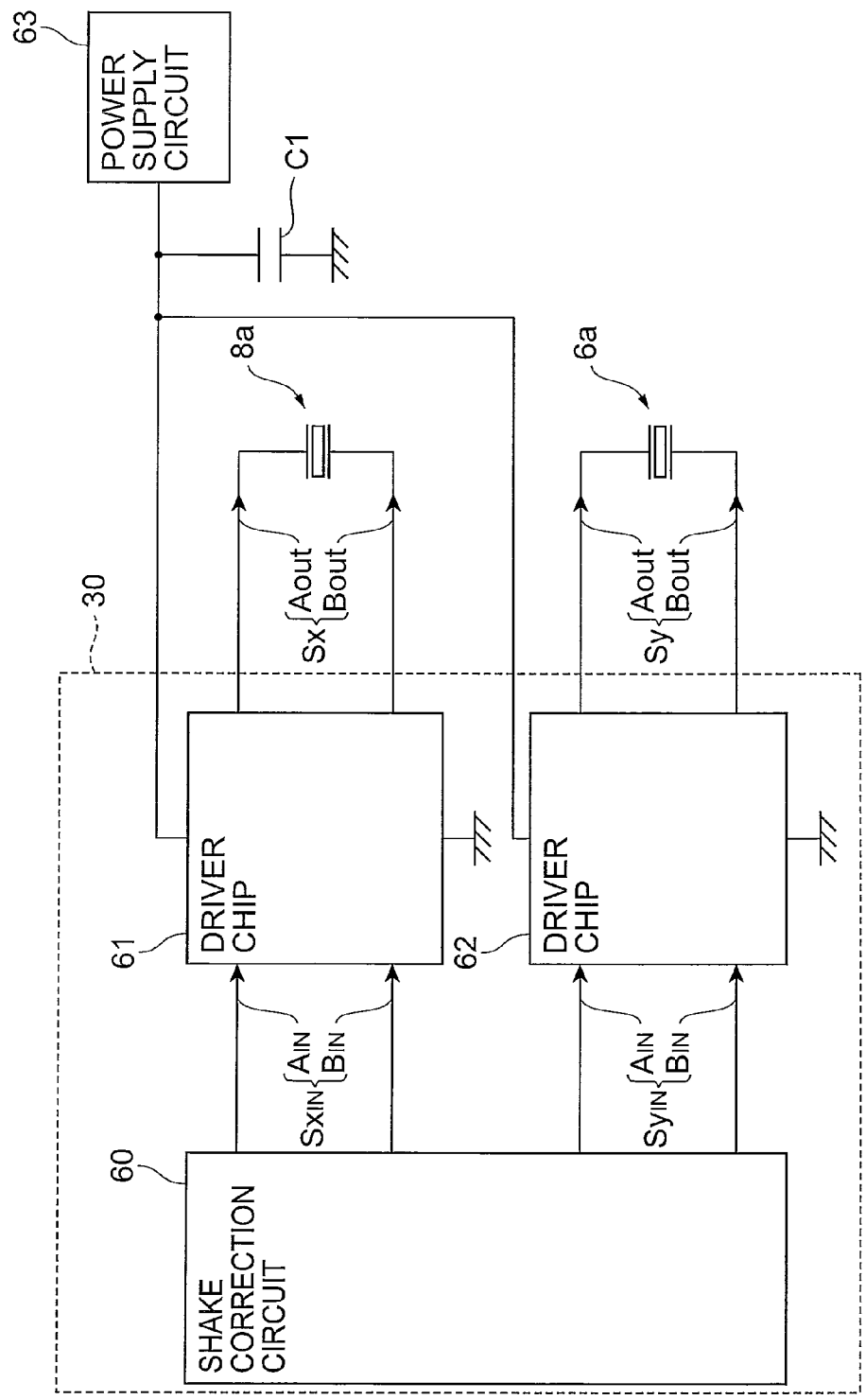
FIG. 4 is a summary diagram showing in detail the electrical configuration of the first control portion 30.

Next, the driving signal output function of the first control portion 30 is explained in detail. FIG. 4 is a summary diagram showing in detail the electrical configuration of the first control portion 30 in the image capture apparatus of this embodiment. As shown in FIG. 4, the first control portion 30 comprises, for example, a shake correction circuit 60 and driver chips 61, 62. The driver chips 61, 62 are provided corresponding to the first actuator 8 and second actuator 6, and are connected to a common power supply circuit 63. A power supply capacitor C1 to stabilize the power supply output is provided between the driver chips 61, 62 and the power supply circuit 63.

The shake correction circuit 60 has a pulse generation circuit 34, and has a function for generating input signals SxIN, SyIN to cause the driver chips 61, 62 to output driving signals Sx, Sy.

The driver chips 61, 62 are connected to the first actuator 8 and second actuator 6 respectively, and function as driving circuits. The driver chips 61, 62 have functions to perform voltage amplification or current amplification of the input signals SxIN, SyIN input from the shake correction circuit 60 and generate driving signals Sx, Sy, and to output the driving signals Sx, Sy to the first actuator 8 and second actuator 6 respectively. The driver chips 61, 62 comprise for example a logic circuit as an input stage, and two field effect transistors (FETs) as an output stage. The two transistors are configured to enable output, as output signals, of Hi output (high-potential output), Lo output (low-potential output), and OFF output (open-circuit output).

Figure 5:
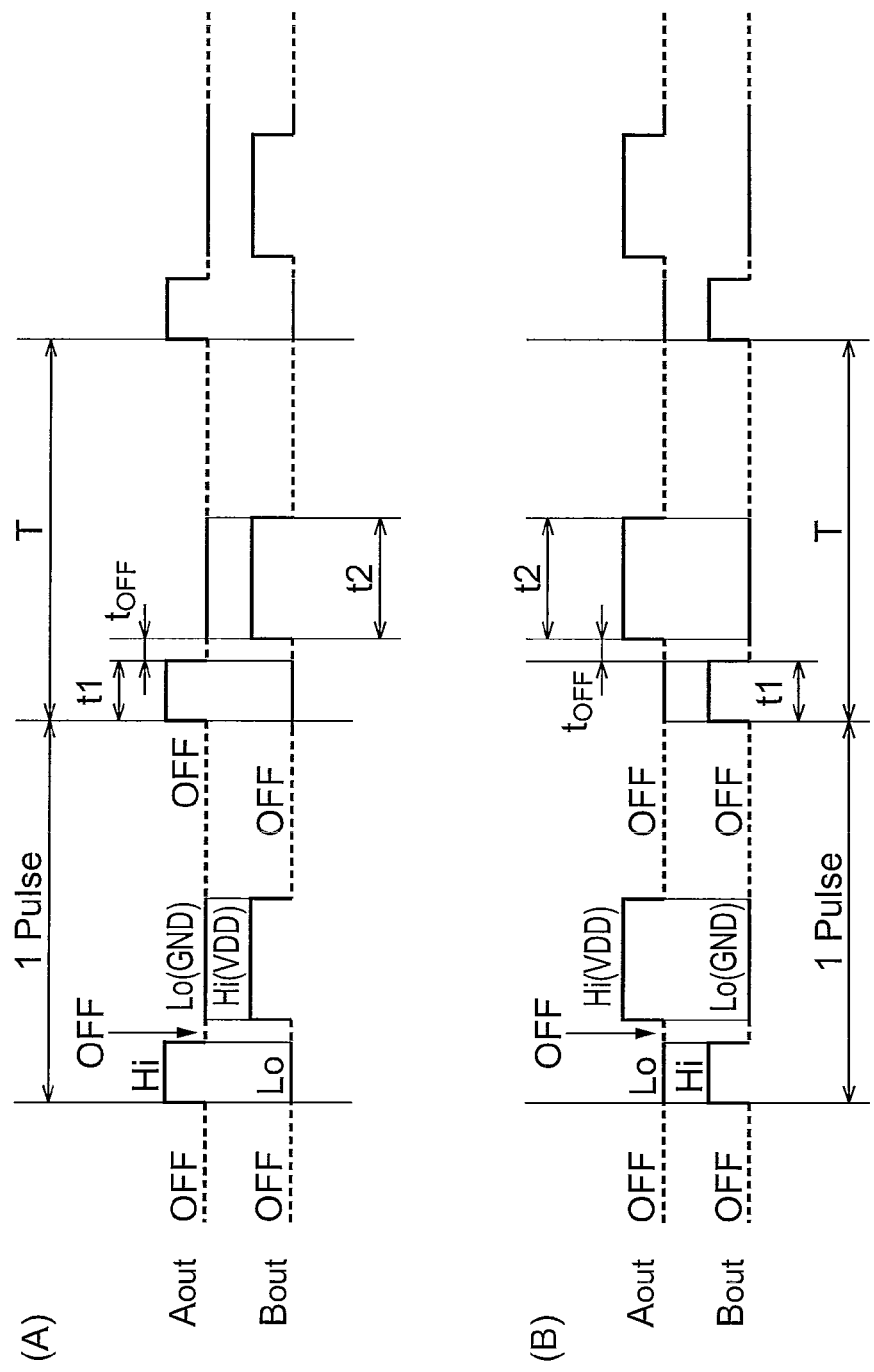
FIG. 5 shows output signals output by a driver chip shown in FIG. 4.

Next, details of the signals output by the driver chips 61, 62 are explained. The signals output by the driver chips 61, 62 differ only in output timing and output destination, and so to facilitate ease of understanding, in the following the output signal output from the driver chip 61 is explained. FIG. 5 shows the output signal Sx output from the driver chip 61; the horizontal axis represents time. The signals in (A) and (B) of FIG. 5 are signals output based on the input signals SxIN, SyIN, and are signals to cause movement of the first movement member 11 (driving control pulse signals). (A) in FIG. 5 shows output signals (first pulse signals) AOUT and output signals (second pulse signals) BOUT which are output when the first movement member 11 is to be moved in the direction approaching the piezoelectric element 8a (signals for forward movement). On the other hand, (B) in FIG. 5 shows output signals AOUT, BOUT which are output when the first movement member 11 is to be moved in the direction receding from the piezoelectric element 8a (signals for reverse movement).

In (A) and (B) of FIG. 5, the two respective pulse signals AOUT, BOUT are signals input to the two terminals of the piezoelectric element 8a (see FIG. 1), and are signals comprised by the above-described driving signal Sx. By providing these two pulse signals with different phases at the same frequency f (period T), the potential difference between signals changes in a steplike manner in one direction, and change rapidly in the reverse direction, or, the potential difference between signals changes rapidly in one direction, and changes in a steplike manner in the reverse direction. And, the potential difference between AOUT and BOUT becomes the voltage input to the piezoelectric element 8a. Through the potential difference between these pulse signals, the piezoelectric element 8a is caused to expand or contract. By inputting the signal continuously one pulse at a time to the first actuator 8, continuous driving is performed.

The pulse signals AOUT, BOUT are set such that, for example, one signal is at Hi output, and after dropping to Lo output, the other signal goes to Hi output. These signals are set such that, when one signal goes to Lo output, after a constant time lag tOFF has elapsed, the other signal goes to Hi output. The Hi output and Lo output application times of the pulse signals AOUT, BOUT are set using a register (not shown) comprised by the pulse generation circuit 34.

Figure 6:
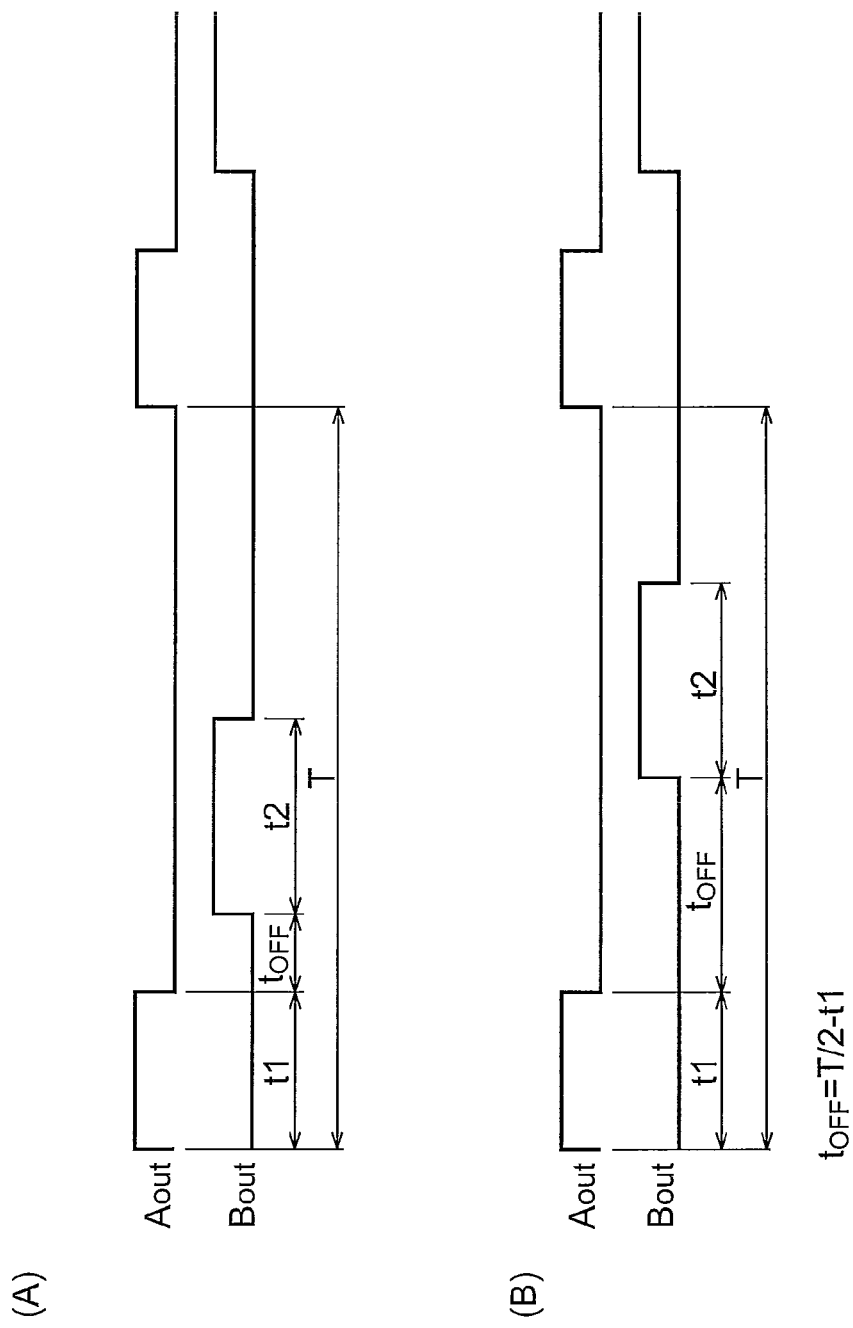
FIG. 6 shows output signals output by a driver chip shown in FIG. 4.

Next, output signals output when the first movement member 11 is not moved are explained. (A) in FIG. 6 shows driving control pulse signals explained using FIG. 5, and (B) in FIG. 6 shows output signals which are output when the first movement member 11 is not to be moved (stopped control pulse signals). In (A) and (B) of FIG. 6, the horizontal axis represents time. As shown in (B) of FIG. 6, when the first movement member 11 is not to be moved, an output signal separate from the driving control pulse signals shown in (A) of FIG. 6, which is an output signal to cause the first movement member 11 to be put into a vibration-arrested state, is applied to the piezoelectric element 8a. The stop control pulse signals AOUT, BOUT shown in (B) of FIG. 6 are signals having the same pulse widths t1, t2 and the same period T as the driving control pulse signals AOUT, BOUT shown in (A) of FIG. 6, and differ only in that the time lag tOFF of the pulse signals AOUT, BOUT is different. That is, by changing only the time lag tOFF of the driving control pulse signals AOUT, BOUT shown in (A) of FIG. 6, the stop control pulse signals AOUT, BOUT shown in (B) of FIG. 6 can easily be generated. The time lag tOFF after modification is for example expressed by equation (1) below.

$$tOFF = T/2 - t1 \qquad (1)$$

By using equation (1), stop control pulse signals can be generated by delaying, by one-half the period T of the driving control pulse signal AOUT, the driving control pulse signal AOUT and the driving control pulse signal BOUT. Equation (1) gives a logical value; if the time lag tOFF is made substantially half the period T of the driving control pulse signal AOUT, stop control pulse signals can be generated. The time duration of substantially one-half the period T means not only half (50%) of the period T, but also the time duration of one-half the period T including errors in design or control, or similar. For example, this range includes errors of approximately 10% from one-half the period T.

The stop control pulse signals AOUT, BOUT are signals having the same time from the change in the signal potential difference to one direction until the change in the reverse direction, as the time from the change in the reverse direction until there is again a change to the one direction. That is, the driving signals execute control such that the interval from the forward-direction charging timing to the reverse-direction charging timing of the piezoelectric element 8a, and the interval from the reverse-direction charging timing to the next forward-direction charging timing, are the same. Through the potential difference of these pulse signals, expansion and contraction of the piezoelectric element 8a are repeated in alternation at a constant interval.

The image capture apparatus of the first embodiment combines the above-described driving control pulse signals and stop control pulse signals to cause the stationary first movement member 11 to move and to cause the first movement member 11 in motion to stop. For example, as shown in (A) of FIG. 7, in the stop control interval immediately before causing the first movement member 11 to move, stop control pulse signals (dot-dash lines) are applied, and in the normal driving interval in which the first movement member 11 is caused to move, driving control pulse signals (dashed lines) are applied; in the stopped control interval after movement over a prescribed distance, stopped control pulse signals (dot-dash lines) are applied. In this way, when causing the first movement member 11 to move, pulse signals (stopped control pulse signals) are applied even in intervals in which the first movement member 11 is stopped.

Figure 8:
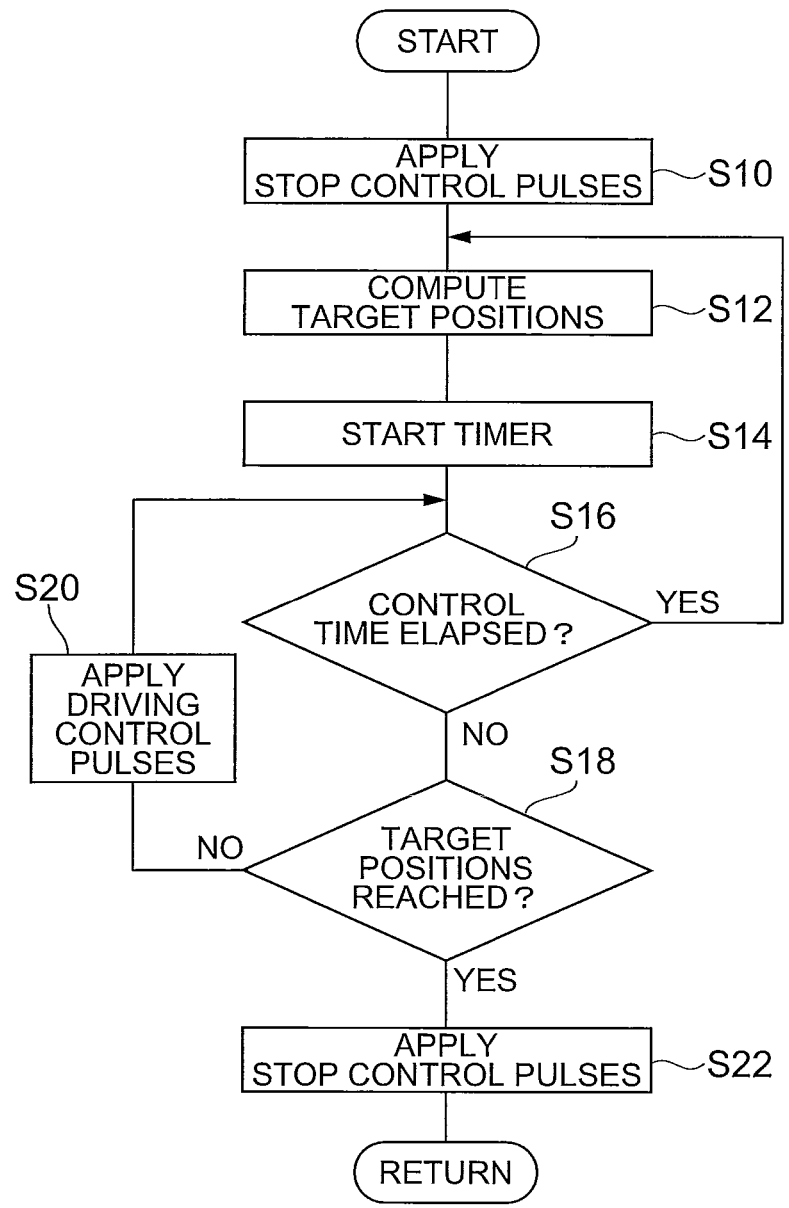
FIG. 8 is a flowchart showing operation of the image capture apparatus of the first embodiment.

Next, operation during shake correction in the image capture apparatus of this embodiment is explained. FIG. 8 is a flowchart showing vibration prevention operation of the image capture apparatus of this embodiment. The processing shown in FIG. 8 is executed repeatedly with prescribed timing after the image capture apparatus power supply is turned on, for example.

When the power supply of the image capture apparatus is turned on, the image capture apparatus starts from signal output processing (S10). The driver chips 61, 62 of the first control portion 30 apply the stop control pulse signals shown in (B) of FIG. 6 to the piezoelectric elements 8a, 6a, and continue the applied state.

Next, the first control portion 30 computes the target position for lens movement in order to cancel shaking (S12). For example, when shaking is occurring at the time of image capture using the image capture apparatus, the shaking amount is detected by the gyro sensors 50 as shown in FIG. 2, and shaking detection signals S1x, S1y are output to the first control portion 30. Based on the detection signals S1x, S1y of the gyro sensors 50 and the detection signals S2x, S2y of the Hall elements 15a and 15b, the first control portion 30 computes output signals Sx, Sy using the shake correction circuit, such that an image captured by the image capture element 14 is not blurred. Then, the first control portion 30 computes the movement distance (target position) necessary for shaking correction.

Next, the first control portion 30 starts a timer for control time (S14). The control time is a time determined when causing the first movement member 11 or second movement member 5 (hereafter called movement members 11 and 5) to move to the target positions computed by the processing of S12.

After the timer is started, the first control portion 30 judges whether the control time has elapsed (S16). When in the processing of S16 the first control portion 30 judges that the control time has elapsed, processing again transitions to processing to compute target positions. By this means, after the control time has elapsed, a new target position is set (S12).

On the other hand, when in the processing of S16 it is judged that the control time has not elapsed, the first control portion 30 judges whether the movement members 11, 5 have reached the target positions computed in S12 (S18).

In the processing of S18, when it is judged that the movement members 11, 5 have not arrived at the target positions, the driver chips 61, 62 applies the driving control pulse signals shown in (A) of FIG. 6 in place of the stop control pulse signals shown in (B) of FIG. 6 (S20). The driver chips 61, 62, by changing the lag time tOFF of the stop control pulse signals, can switch the stop control pulse signals shown in (B) of FIG. 6 to the driving control pulse signals shown in (A) of FIG. 6. After switching to and applying the driving control pulse signals, processing transitions to processing to judge whether or not the control time has elapsed (S16). If the control time has not yet elapsed, and it is judged that the target positions have not been reached, driving control pulse signals are further applied (S18, S20). In this way, processing to apply driving control pulse signals is repeatedly executed within the control time until the target positions are reached.

On the other hand, when in the processing of S18 it is judged that the movement members 11, 5 have reached the target positions, the driver chips 61, 62 apply the driving control pulse signals shown in (B) of FIG. 6 in place of the stop control pulse signals shown in (A) of FIG. 6 (S22). By changing the lag time tOFF of the stop control pulse signals, the driver chips 61, 62 switch the driving control pulse signals shown in (A) of FIG. 6 to the stop control pulse signals shown in (B) of FIG. 6. When the processing of S22 ends, the control processing shown in FIG. 8 ends.

In the above, by executing the control processing shown in FIG. 8, target positions for shake correction are calculated, and driving signals to move the movement members 11, 5 to the target positions are applied to the piezoelectric elements 8a, 6a. For example, as shown in (A) of FIG. 9, prior to moving the movement members 11, 5, stop control pulse signals (solid lines) are applied to the piezoelectric elements 8a, 6a, and when the movement members 11, 5 are to be moved to the target positions, driving control pulse signals (dashed lines) are applied to the piezoelectric elements 8a, 6a; after the movement members 11, 5 have been moved, stop control pulse signals are applied to the piezoelectric elements 8a, 6a.

Figure 9:
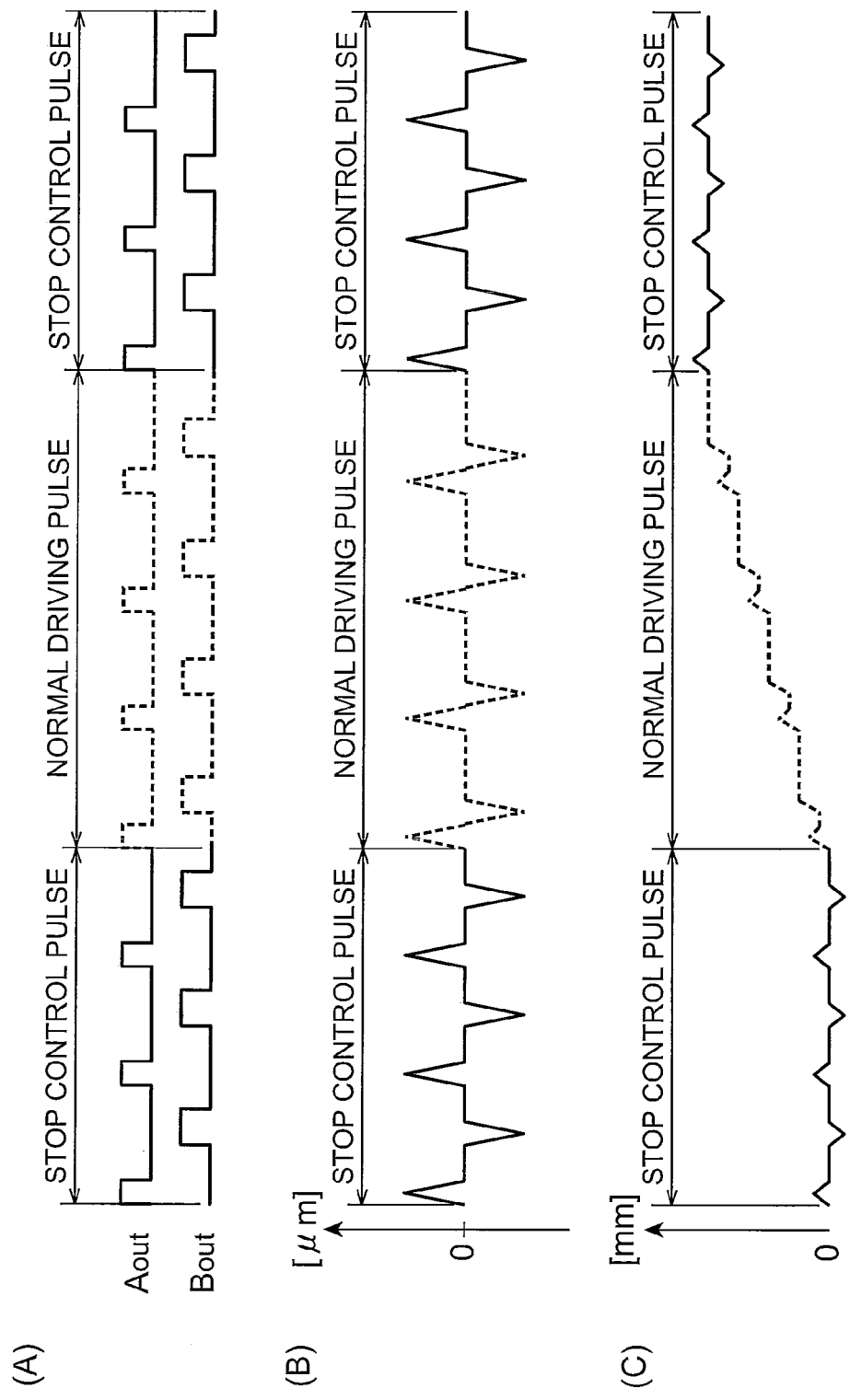
FIG. 9 is a summary diagram explaining behavior of the piezoelectric element and movement member shown in FIG. 1.

Next, behavior of the driving shafts 8b, 6b and movement members 11, 5 when the output signals of (A) in FIG. 9 are applied is explained. In the following, to facilitate ease of understanding, a case is explained in which output signals are applied only to the piezoelectric element 8a.

(B) in FIG. 9 shows the behavior of the driving shaft 8b in response to the output signals in (A) of FIG. 9; the vertical axis indicates the displacement amount, and the horizontal axis represents time. The displacement amount is shown with reference to a state of no driving (displacement 0). Also, (C) in FIG. 9 shows the behavior of the first movement member 11 in response to the output signals in (A) of FIG. 9; the vertical axis indicates the movement amount of the first movement member, and the horizontal axis represents time. The movement amount is with reference to before the start of movement (displacement 0).

Figure 10:
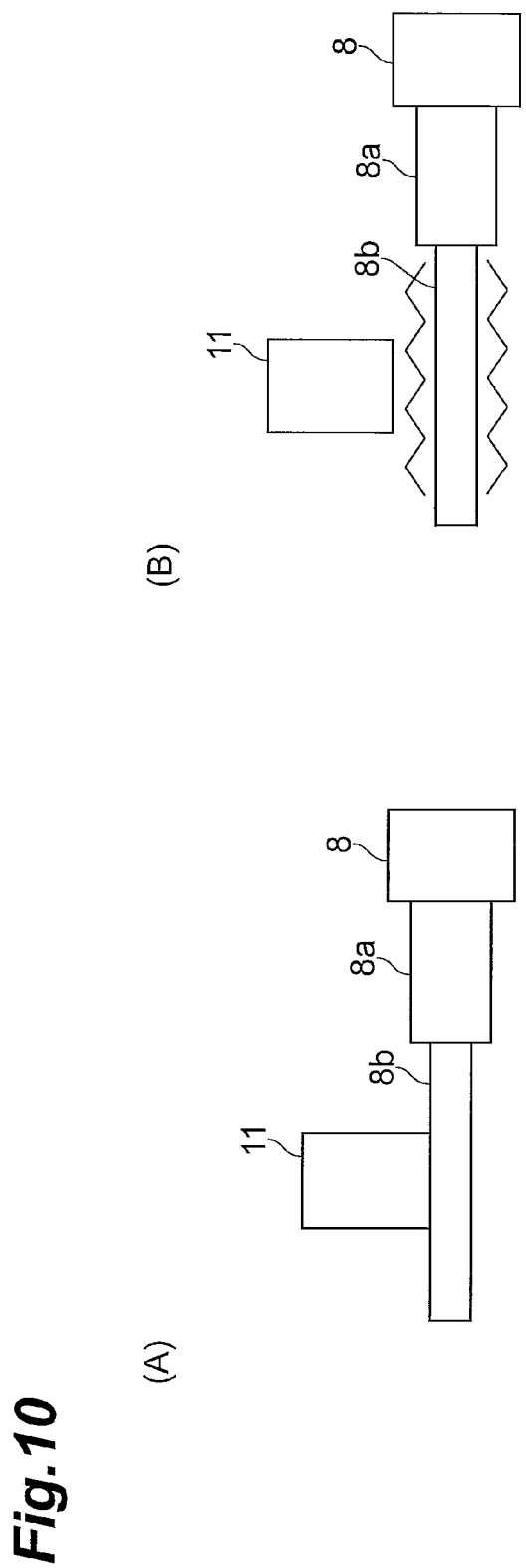
FIG. 10 is a summary diagram explaining behavior of the piezoelectric element and movement member shown in FIG. 1.

As shown in (A) of FIG. 9, when prior to starting movement of the first movement member 11 stop control pulse signals are applied to the piezoelectric element 8a, the driving shaft 8b performs driving such that the interval from positive displacement to negative displacement, and the interval from negative displacement to the next positive displacement, are the same, as shown in (B) of FIG. 9. That is, the driving shaft 8b, in a vibrating state, is displaced by equal intervals in the positive direction and in the negative direction in alternation. In this case, as shown in (C) in FIG. 9, the first movement member 11 does not move from the original place, and remains substantially stationary in that place (vibration-arrested state). The state in which stop control pulse signals are applied is explained using FIG. 10. (A) in FIG. 10 is a summary diagram for a case in which stop control pulse signals are not applied, and (B) in FIG. 10 is a summary diagram for a case in which stop control pulse signals are applied while the first movement member 11 is stopped. As shown in (B) of FIG. 10, by applying stop control pulse signals to the piezoelectric element 8a while the first movement member 11 is stopped, the driving shaft 8b undergoes continuous expansion and contraction at equal intervals to vibrate, and compared with the case of (A) in FIG. 10, the first movement member 11 is in a state of slight elevation, and is in the vibration-arrested state. Hence compared with the case of (A) in FIG. 10, the state is a state in which the friction force occurring between the first movement member 11 and the driving shaft 8b is reduced. Hence the first movement member 11 is placed into a state in which movement can be started smoothly, and in addition noise at the time of the start of movement arising from friction can be reduced.

On the other hand, when driving control pulse signals to move the first movement member 11 are applied as shown in (A) of FIG. 9, the driving shaft 8b performs driving such that from positive displacement there is sudden negative displacement, as shown in (B) of FIG. 9. Hence as shown in (C) of FIG. 9, the first movement member 11 gradually moves in the positive direction.

On the other hand, when stop control pulse signals are applied to the piezoelectric element 8a after the end of movement of the first movement member 11 as shown in (A) of FIG. 9, similarly to before the start of movement of the first movement member 11, the driving shaft 8b is in a vibrating state as shown in (B) of FIG. 9. Hence as shown in (C) of FIG. 9, the first movement member 11 is substantially in a stopped state in the same place, and noise at the time of the end of movement can be reduced.

Figure 11:
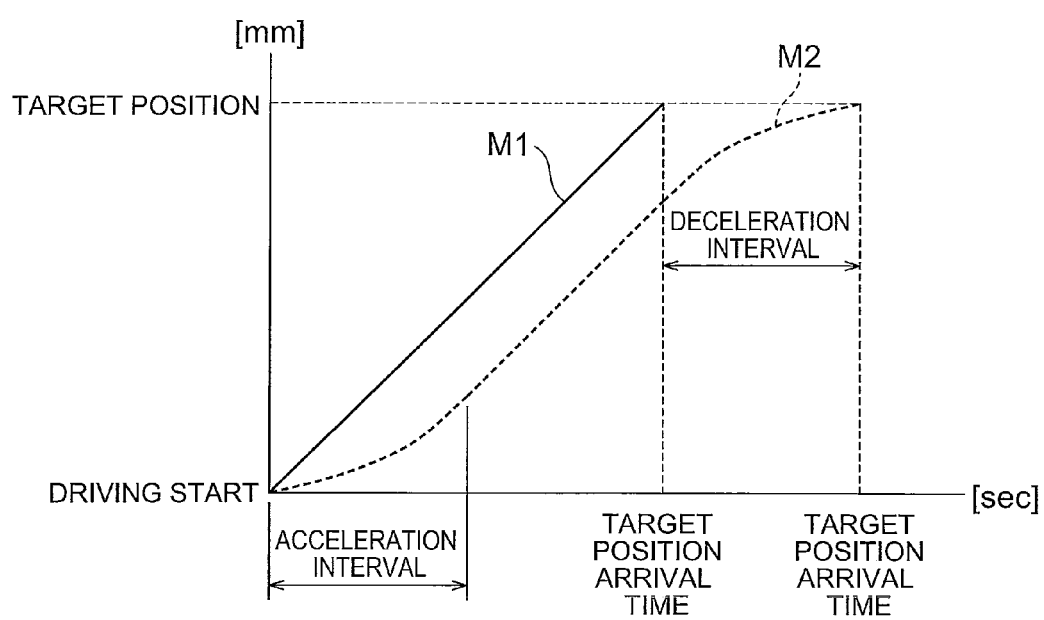
FIG. 11 is a summary diagram explaining the time dependence of the movement position of the movement member shown in FIG. 1.
Figure 14:
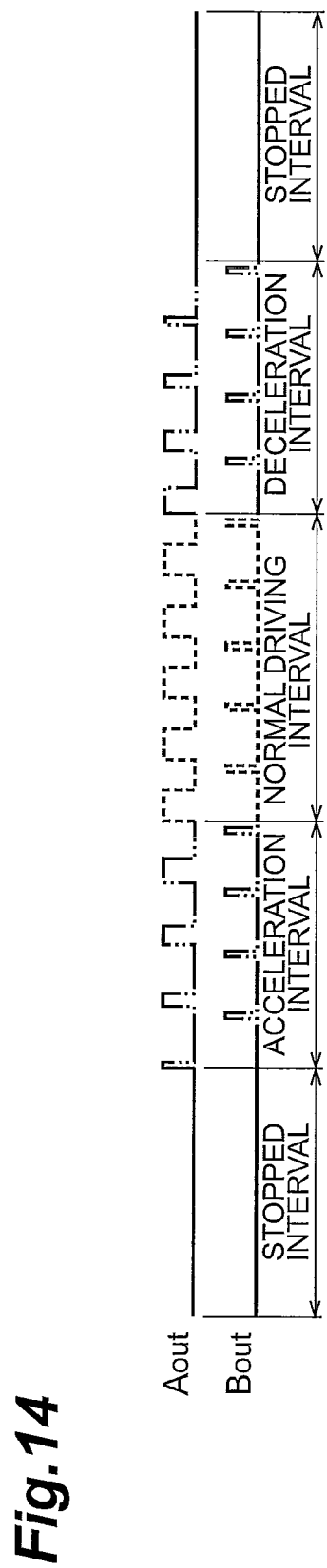
FIG. 14 shows driving pulse signals with pulse width and pulse interval modified.

Next, the movement velocity of the first movement member 11 when the pulse signals shown in (A) of FIG. 9 are applied is explained. FIG. 11 is a graph which plots position along the vertical axis and time along the horizontal axis; the case in which movement control is performed using stop control pulse signals as shown in (A) of FIG. 9 is represented by the solid line M1. And, the case in which movement control is performed in which pulse widths and pulse intervals are controlled as a means of reducing noise as shown in FIG. 14 is represented by the dashed line M2. By applying stop control pulse signals when the first movement member 11 is not moved, the stopped first movement member 11 is placed into a state of little friction with the driving shaft 8b, and is in a state in which immediate movement is possible, so that as shown in M1 in FIG. 11, an acceleration interval and deceleration interval are not necessary. Hence the first movement member 11 can be moved at uniform velocity. In this case, compared with M2 in FIG. 11, the time until arrival at the target position can be shortened.

Thus in the driving apparatus and image capture apparatus of the first embodiment, even when the stopped movement members 11, 5 are not moved, stop control pulse signals are applied to the piezoelectric elements 8a, 6a. By means of this configuration, the friction engagement between the drift shafts 8b, 6b and the movement members 11, 5 which are not moving can be weakened, so that the stopped movement members 11, 5 can be moved smoothly, and the movement members 11, 5 in motion can be stopped smoothly. Hence through the simple control of applying stop control pulse signals when the movement members 11, 5 are not moved, operation noise can be reduced without controlling the pulse width of driving signals. Further, the movement velocities of the movement members 11, 5 can be made uniform, and movement times can be shortened.

Further, in the driving apparatus and image capture apparatus of the first embodiment, when the movement members 11, 5 are not moved, by applying stop control pulse signals the driving shafts alone can be caused to vibrate with hardly any movement of the movement members 11, 5, so that friction engagement between the stopped movement members 11, 5 and the driving shafts can be weakened. Hence operation noise can be reduced through simple control.

Further, in the driving apparatus and image capture apparatus of the first embodiment, stop control pulse signals can be generated merely by controlling only the time lag tOFF of the first pulse signals AOUT and second pulse signals BOUT of the driving control pulse signals, so that operation noise can be reduced through still more simple control.

Further, in the image capture apparatus of the first embodiment, while reducing operation noise which occurs at the time of movement of the image capture optical system 2, the movement velocity of the image capture optical system 2 can be made constant, and moreover the movement time of the image capture optical system 2 can be shortened. In shake correction control, processing execution is decided according to whether shaking occurs, so that processing is performed in which driving and stopping of the actuators 8, 6 are repeated (intermittent driving). Operation noise occurs accompanying sudden driving and stopping, and so readily occurs when intermittent driving is performed. Hence by using stop control pulse signals in an image capture apparatus having a shake correction mechanism, shake correction with frequent intermittent driving can be performed with high precision and high sensitivity, and moreover operation noise can be reduced. Further, recording of operation noise during video capture can be avoided.

Second Embodiment

An image capture apparatus comprising the driving apparatus of a second embodiment is configured substantially similarly to the image capture apparatus of the first embodiment, and compared with the image capture apparatus of the first embodiment, only operation of the first control portion 30 is different. In the second embodiment, explanations of portions which are redundant with the first embodiment are omitted, and differences are mainly explained.

First, the configuration of the image capture apparatus comprising the driving apparatus of the second embodiment is explained. The first control portion 30 of the driving apparatus of the second embodiment has a function for controlling the time of application of stop control pulse signals. Other functions are the same as in the first control portion 30 of the first embodiment.

Figure 12:
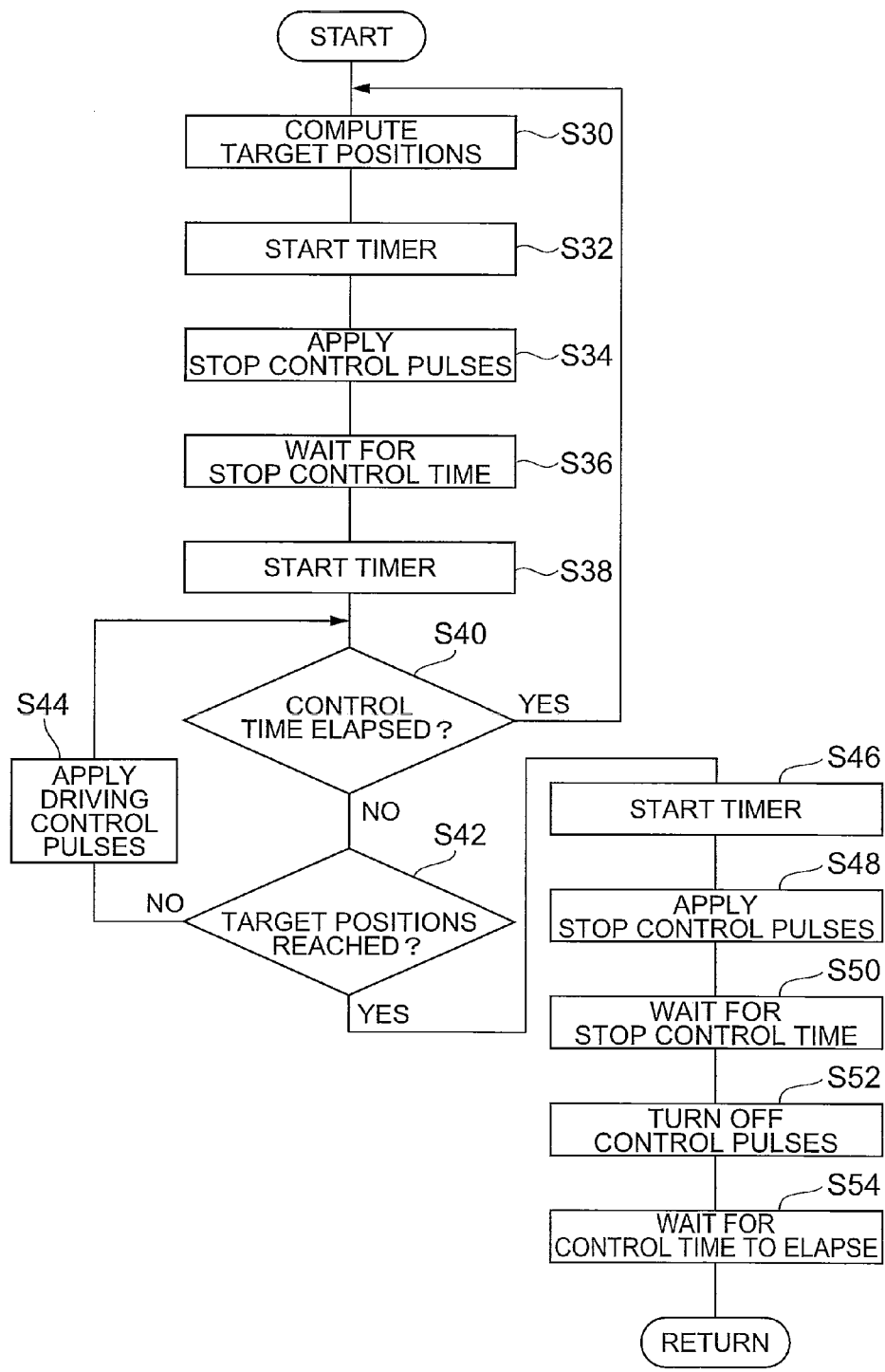
FIG. 12 is a flowchart showing operation of the image capture apparatus of the second embodiment.

Next, vibration prevention operation of the image capture apparatus comprising the driving apparatus of the second embodiment is explained. FIG. 12 is a flowchart showing vibration prevent operation of the image capture apparatus comprising the driving apparatus of the embodiment. The processing shown in FIG. 12 is for example executed repeatedly with prescribed timing after the power supply of the image capture apparatus is turned on.

When the power supply of the image capture apparatus is turned on, the first control portion 30 computes the target positions for lens movement to cancel shaking (S30). This processing is the same as the processing of S12 in FIG. 8, and is processing to compute output signals and movement distances (target positions) for shake correction.

After computing target positions, the first control portion 30 starts a timer for a stop control time (S32). The stop control time is used to control the time of application of stop control pulse signals. Next, the driver chips 61, 62 of the first control portion 30 enter a state enabling application of the stop control pulse signals shown in (B) of FIG. 6 to the piezoelectric elements 8*a*, 6*a*. Here, the driver chips 61, 62 start application of the stop control pulse signals after the stop control time set in the processing of S32 has elapsed, and continue the applied state (S34, S36).

Next, the first control portion 30 starts the control time timer (S38). This processing is similar to the processing of S14 in FIG. 8. After starting the timer, the first control portion 30 judges whether the control time has elapsed (S40). When in the processing of S40 the first control portion 30 judges that the control time has elapsed, processing again transitions to processing to compute target positions. By this means, when the control time has elapsed, new target positions are set (S30).

On the other hand, when in the processing of S40 it is judged that the control time has not elapsed, the first control portion 30 judges whether the movement members 11, 5 have reached the target positions computed in the processing of S30 (S42).

When in the processing of S42 it is judged that the movement members 11, 5 have not reached the target positions, the driver chips 61, 62 apply the driving control pulse signals shown in (A) of FIG. 6 in place of the stop control pulse signals shown in (B) of FIG. 6 (S44), similarly to the processing of S20 in FIG. 8. And, processing transitions to processing to judge whether the control time has elapsed, and if the control time has not elapsed, and it is judged that the target positions have not been reached, further driving control pulse signals are applied (S40, S42, S44). In this way, within the control time, processing to apply driving control pulse signals is repeatedly executed until the target positions are reached.

On the other hand, when in the processing of S42 it is judged that the movement members 11, 5 have reached the target positions, the first control portion 30 starts the timer for the stop control time (S46). This processing is similar to the processing of S32. The stop control time set in the processing of S42 can be set to a value different from the stop control time set in the processing of S32. For example, the stop control time set in the processing of S42 can be set to be long compared with the stop control time set in the processing of S32. And, the driver chips 61, 62 apply the driving control pulse signals shown in (B) of FIG. 6 in place of the stop control pulse signals shown in (A) in FIG. 6 (S48). By changing the time lag tOFF of the stop control pulse signals, the driver chips 61, 62 can switch the driving control pulse signals shown in (A) of FIG. 6 to the stop control pulse signals shown in (B) of FIG. 6. And, after the stop control time set in the processing of S46 has elapsed, application of the stop control pulse signals is ended, and after the control time set in the processing of S40 has elapsed, the control processing shown in FIG. 12 ends (S50, S52, S54).

Figure 7:
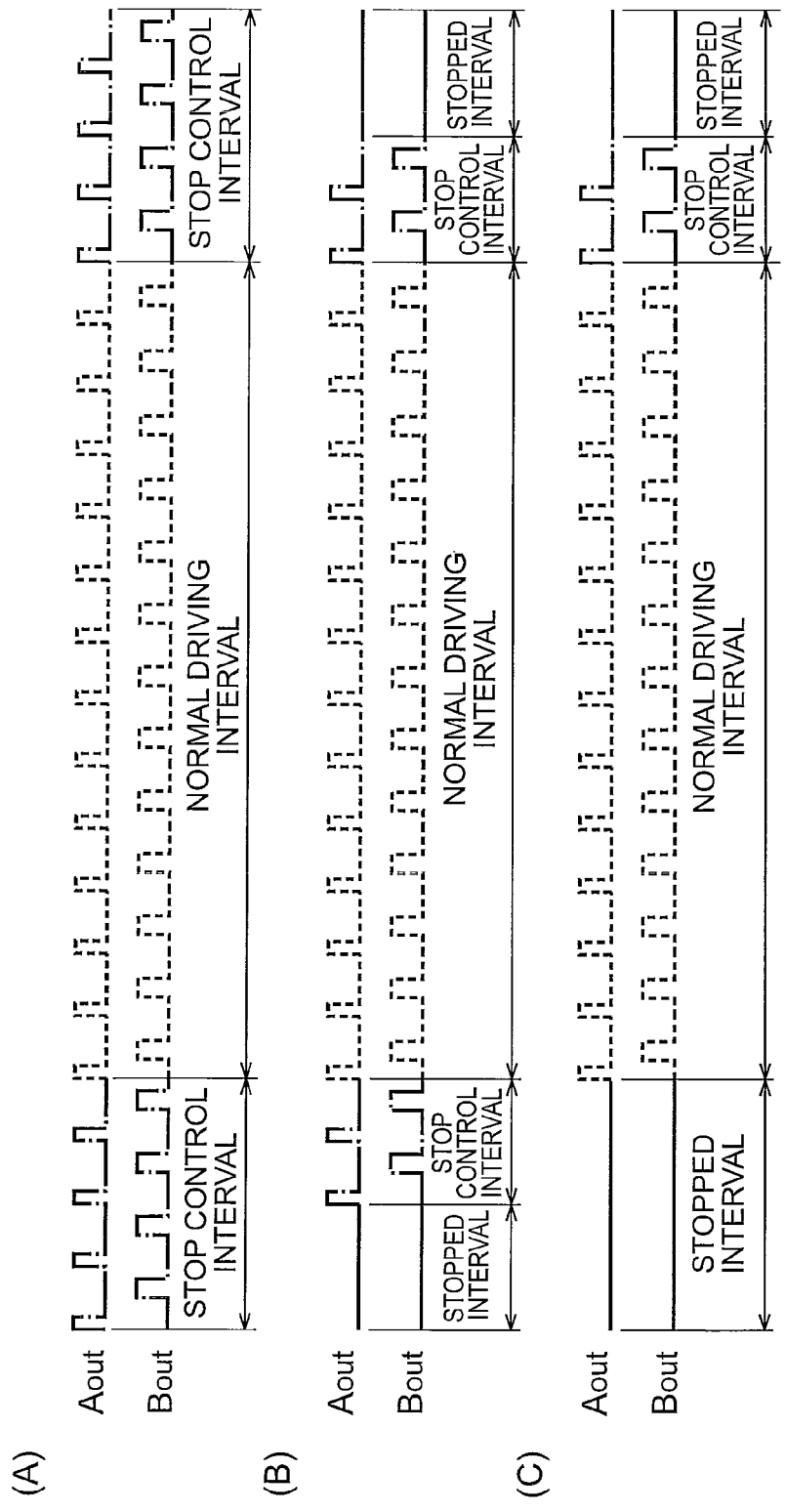
FIG. 7 shows driving signals in the image capture apparatus of an embodiment of the invention.

Thus by executing the control processing shown in FIG. 12, target positions in shake correction are computed, and driving signals to cause movement of the movement members 11, 5 to the target positions are applied to the piezoelectric elements 8*a*, 6*a*. And, as shown in (B) of FIG. 7, stop control pulse signals (dot-dash lines) can be applied in stop control intervals before moving the movement members 11, 5 and in stop control intervals immediately after the movement members 11, 5 have been moved. The stopped interval shown in (B) of FIG. 7 is an interval during which control is performed in which no pulses at all are applied.

When in the processing of S42 a stop control time is set which is longer than the stop control time set in the processing of S32, the stop control pulse application interval immediately after the movement members 11, 5 have been moved can be set to be long compared with the stop control pulse signal application interval immediately before the movement members 11, 5 are moved. In this case, noise occurring immediately after the movement members 11, 5 have been moved can be effectively reduced.

As explained above, in the driving apparatus and image capture apparatus of the second embodiment, in the stop control interval immediately before the start of movement or immediately after the end of movement of the movement members 11, 5, stop control pulse signals are applied to the piezoelectric elements 8*a*, 6*a*. By means of this configuration, the stopped movement members 11, 5 can be moved smoothly, and the movement members 11, 5 in motion can be smoothly stopped. Hence through simple control in which stop control pulse signals are applied when the movement members 11, 5 are not moved, operation noise can be reduced, without controlling the pulse width of driving signals. Further, the movement velocities of the movement members 11, 5 can be made uniform, and movement times can be shortened.

Further, in the driving apparatus and image capture apparatus of the second embodiment, stop control pulse signals can be applied only in the stop control intervals immediately before moving, and in the stop control intervals immediately after having moved, the movement members 11, 5, so that operation noise can be efficiently eliminated. Further, the time of application of stop control pulse signals can be decreased, so that power consumption can be suppressed.

Further, in the driving apparatus and image capture apparatus of the second embodiment, a greater number of stop control pulses can be applied compared with the start of movement after the end of movement, in which noise occurs more readily than at the start of movement, so that operation noise immediately after the movement members 11, 5 have been moved can be appropriately eliminated.

Third Embodiment

An image capture apparatus comprising the driving apparatus of a third embodiment is configured substantially similarly to the image capture apparatus comprising the driving apparatus of the first embodiment, and compared with the image capture apparatus of the first embodiment, only operation of the first control portion 30 is different. In the third embodiment, explanations of portions which are redundant with the first embodiment or the second embodiment are omitted, and differences are mainly explained.

First, the configuration of the image capture apparatus comprising the driving apparatus of the third embodiment is explained. The first control portion 30 of the driving apparatus of the third embodiment has a function for controlling the time of application of stop control pulse signals, similarly to the second embodiment. Other functions are the same as in the first control portion 30 of the first embodiment.

Figure 13:
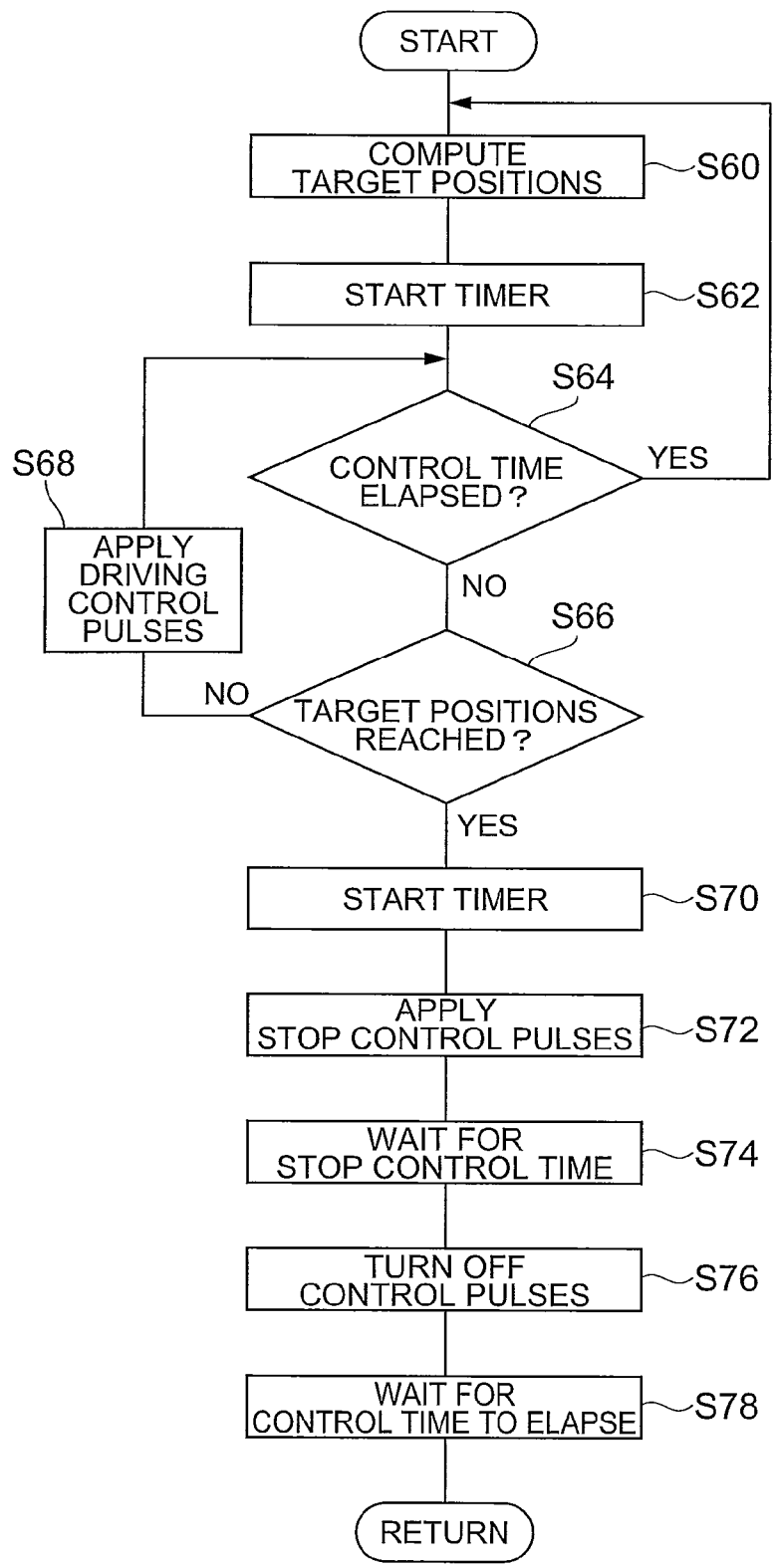
FIG. 13 is a flowchart showing operation of the image capture apparatus of the third embodiment.

Next, vibration prevention operation of the image capture apparatus comprising the driving apparatus of the third embodiment is explained. FIG. 13 is a flowchart showing vibration prevent operation of the image capture apparatus comprising the driving apparatus of the embodiment. The processing shown in FIG. 13 is for example executed repeatedly with prescribed timing after the power supply of the image capture apparatus is turned on.

When the power supply of the image capture apparatus is turned on, the first control portion 30 computes the target positions for lens movement to cancel shaking (S60). This processing is the same as the processing of S12 in FIG. 8, and is processing to compute output signals and movement distances (target positions) for shake correction.

After computing target positions, the first control portion 30 starts a timer for a control time (S62). This processing is similar to the processing of S14 in FIG. 8. After starting the timer, the first control portion 30 judges whether the control time has elapsed (S64). When in the processing of S64 the first control portion 30 judges that the control time has elapsed, processing again transitions to processing to compute target positions. By this means, when the control time has elapsed, new target positions are set (S60).

On the other hand, when in the processing of S64 it is judged that the control time has not elapsed, the first control portion 30 judges whether the movement members 11, 5 have reached the target positions computed in the processing of S60 (S66).

When in the processing of S66 it is judged that the movement members 11, 5 have not reached the target positions, the driver chips 61, 62 apply the driving control pulse signals shown in (A) of FIG. 6 (S68). And, processing transitions to processing to judge whether the control time has elapsed, and if the control time has not elapsed, and it is judged that the target positions have not been reached, further driving control pulse signals are applied (S64, S66, S68). In this way, within the control time, processing to apply driving control pulse signals is repeatedly executed until the target positions are reached.

On the other hand, when in the processing of S66 it is judged that the movement members 11, 5 have reached the target positions, the first control portion 30 starts the timer for the stop control time (S46). This processing is similar to the processing of S46 in FIG. 12. And, the driver chips 61, 62 apply the driving control pulse signals shown in (B) of FIG. 6 in place of the stop control pulse signals shown in (A) in FIG. 6 (S72). By changing the time lag tOFF of the stop control pulse signals, the driver chips 61, 62 can switch the driving control pulse signals shown in (A) of FIG. 6 to the stop control pulse signals shown in (B) of FIG. 6. And, after the stop control time set in the processing of S70 has elapsed, application of the stop control pulse signals is ended, and after the control time set in the processing of S62 has elapsed, the control processing shown in FIG. 13 ends (S74, S76, S78).

Thus by executing the control processing shown in FIG. 13, target positions in shake correction are computed, and driving signals to cause movement of the movement members 11, 5 to the target positions are applied to the piezoelectric elements 8*a*, 6*a*. And, as shown in (C) of FIG. 7, stop control pulse signals can be applied only in stop control intervals immediately after the movement members 11, 5 have been moved.

As explained above, in the driving apparatus and image capture apparatus of the third embodiment, in the stop control interval immediately after the end of movement of the movement members 11, 5, stop control pulse signals are applied to the piezoelectric elements 8*a*, 6*a*. By means of this configuration, the friction engagement between the driving shafts 8*b*, 6*b* and the stationary movement members 11, 5 can be weakened, so that the movement members 11, 5 in motion can be smoothly stopped. Hence through simple control in which stop control pulse signals are applied when the movement members 11, 5 are not moved, operation noise immediately after the end of movement can be reduced, without controlling the pulse width of driving signals.

Further, in the driving apparatus and image capture apparatus of the third embodiment, stop control pulse signals can be applied only in the stop control intervals immediately after the end of movement, when noise occurs more readily than at the start of movement, so that operation noise can be efficiently reduced.

The above-described embodiments present examples of driving apparatuses, optical apparatuses, and driving signal control circuits of the invention. The driving apparatuses, optical apparatuses, and driving signal control circuits of the invention are not limited to the driving apparatuses, optical apparatuses, and driving signal control circuits of these embodiments, and the driving apparatuses, optical apparatuses, and driving signal control circuits of these embodiments can be modified, or applied to other apparatuses, without deviating from the gist disclosed in the scope of claims.

For example, in the above-described first to third embodiments, cases were explained in which, as a shake correction mechanism, an image capture optical system 2 is moved with respect to an image capture element 14 according to shaking; but the image capture element 14 may be moved with respect to the image capture optical system 2. In this case also, advantageous results similar to those of the image capture apparatuses of the above-described embodiments are obtained.

Further, in the above-described embodiments, examples were explained in which an image capture optical system is moved as an optical element; but an image capture element or another optical element may be moved. Also, application to driving apparatuses and similar which drive stages, probes, and similar is also possible.

Further, in the above-described embodiments, examples were explained in which an image capture apparatus was preferentially adopted as an optical apparatus; but adoption in the driving of an inkjet print head, or in control of piezoelectric elements used in ink spraying, ignition devices, and similar is also possible.

PRACTICAL EXAMPLES

Below, a practical example implemented by the inventor to explain the above advantageous results, and a comparative example, are explained.

Practical Example 1

The driving apparatus shown in FIG. 1 was used. The driving signals shown in (A) of FIG. 7 were repeatedly input to the actuator 8, and control was repeatedly executed in which the first movement member 11 was driven for 10 ms and then stopped for 10 ms.

Practical Example 2

The driving signals shown in (A) of FIG. 7 were repeatedly input to the actuator 8, and control was repeatedly executed in which the first movement member 11 was driven for 2 ms and then stopped for 2 ms. Otherwise the configuration was similar to that of Practical Example 1.

Practical Example 3

The driving signals shown in (B) of FIG. 7 were repeatedly input to the actuator 8, and control was repeatedly executed in which the first movement member 11 was driven for 2 ms and then stopped for 2 ms. The output intervals of the stop control pulse signals shown in (B) of FIG. 7 were set to 0.5 ms before and after the start of input of driving control pulse signals. Otherwise the configuration was similar to that of Practical Example 1.

Comparative Example 1

Driving signals were repeatedly input to the actuator 8 without using stop control pulse signals, and control was repeatedly executed in which the first movement member 11 was driven for 10 ms and then stopped for 10 ms. Otherwise the configuration was similar to that of Practical Example 1.

Comparative Example 2

Driving signals were repeatedly input to the actuator 8 without using stop control pulse signals, and control was repeatedly executed in which the first movement member 11 was driven for 2 ms and then stopped for 2 ms. Otherwise the configuration was similar to that of Practical Example 1.

In the driving apparatuses of the above-described Practical Example 1 and Comparative Example 1, operation noise was measured. Measurements were started with the timing at which movement of the first movement member 11 was started, and measurements were performed until 60 ms had elapsed. The results appear in FIG. 15. (A) of FIG. 15 shows the results of operation noise measurements for the driving apparatus of Comparative Example 1, and (B) of FIG. 15 shows the results of operation noise measurements for the driving apparatus of Practical Example 1. In the measurement results, the vertical axes show measured values indicating the magnitude of operation noise, and horizontal axes indicate the measurement time.

As shown in (A) of FIG. 15, in the driving apparatus of Comparative Example 1, operation noise was observed at the time of the start of movement (0 ms, 20 ms, 40 ms) and at the time of the end of movement (10 ms, 30 ms, 50 ms). In particular, measurements indicated that operation noise at the end of movement is greater than operation noise at the start of movement. On the other hand, in the driving apparatus of Practical Example 1, as shown in (B) of FIG. 15, operation noise at the end of movement was greatly reduced compared with the driving apparatus of Comparative Example 1. Thus the advantageous result in reducing operation noise by employing stop control pulse signals was confirmed.

Further, operation noise was measured in the driving apparatuses of the above-described Practical Examples 2 and 3 and Comparative Example 2. Measurements were started 1 ms before movement of the first movement member 11 was started, and measurements were performed until 5 ms had elapsed. The measurement results for Comparative Example 2 appear in (A) of FIG. 16, the measurement results for Practical Example 2 appear in (A) of FIG. 17, and the measurement results for Practical Example 3 appear in (A) of FIG. 18. In (A) of FIG. 16, (A) of FIG. 17, and (A) of FIG. 18, the vertical axes show measured values indicating the magnitude of operation noise, and horizontal axes indicate the measurement time. And, frequency analysis results corresponding to (A) of FIG. 16, (A) of FIG. 17, and (A) of FIG. 18 appear in (B) of FIG. 16, (B) of FIG. 17, and (B) of FIG. 18.

As shown in (A) of FIG. 16, in the driving apparatus of Comparative Example 2, operation noise was observed at the start of movement (1 ms) and at the end of movement (3 ms). As shown in (B) of FIG. 16, much noise at approximately 7 to 10 kHz was observed.

On the other hand, in the driving apparatus of Practical Example 2, operation noise at the start of movement and at the end of movement was greatly reduced compared with the driving apparatus of Comparative Example 2, as shown in (A) of FIG. 17. And as shown in (A) of FIG. 17, compared with the driving apparatus of Comparative Example 2, the frequency peak intensity was reduced. Hence the advantageous result of reducing operation noise by using stop control pulse signals was confirmed.

And, in the driving apparatus of Practical Example 3, operation noise at the start of movement and at the end of movement was greatly reduced compared with the driving apparatus of Comparative Example 2, as shown in (A) of FIG. 18. And as shown in (A) of FIG. 18, compared with the driving apparatus of Comparative Example 2, the frequency peak intensity was reduced in the driving apparatus of Practical Example 3. Thus the advantageous result of reduced operation noise even when stop control pulse signals were applied only in prescribed intervals immediately before the start of movement and immediately after the end of movement was confirmed.

What is claimed is:

1. A driving apparatus, comprising:
   an electromechanical transducing element which undergoes expansion/contraction motion by a driving signal;
   a driving shaft which is mounted on the electromechanical transducing element, and undergoes reciprocating movement according to the expansion/contraction motion of the electromechanical transducing element;
   a driven member which is friction-engaged with the driving shaft, and moves due to the reciprocating movement of the driving shaft; and
   a driving signal control circuit which applies the driving signal to the electromechanical transducing element,
   wherein the driving signal control circuit applies a first driving signal when the driven member is to be moved, and applies a second driving signal when the driven member is not to be moved to put the driven member into a vibration-arrested state,
   wherein the second driving signal is a signal for which an interval from a forward-direction charging timing to a reverse-direction charging timing of the electromechanical transducing element, and an interval from the reverse-direction charging timing to the next forward-direction charging timing, are the same.

2. The driving apparatus according to claim 1, wherein the first driving signal comprises a first pulse signal and a second pulse signal, and the second driving signal comprises the first pulse signal and a pulse signal obtained by delaying the second pulse signal by a time equal to substantially half the period of the first pulse signal.

3. The driving apparatus according to claim 1, wherein the driving signal control circuit applies the second driving signal for a prescribed interval immediately before the driven member is moved, and for a prescribed interval immediately after the driven member has been moved.

4. The driving apparatus according to claim 2, wherein the driving signal control circuit applies the second driving signal for a prescribed interval immediately before the driven member is moved, and for a prescribed interval immediately after the driven member has been moved.

5. The driving apparatus according to claim 3, wherein the driving signal control circuit applies the second driving signal such that the number of pulses of the second driving signal applied in the prescribed interval immediately after the driven member has been moved is greater than the number of pulses of the second driving signal applied in the prescribed interval immediately before the driven member is moved.

6. The driving apparatus according to claim 4, wherein the driving signal control circuit applies the second driving signal such that the number of pulses of the second driving signal applied in the prescribed interval immediately after the driven member has been moved is greater than the number of pulses of the second driving signal applied in the prescribed interval immediately before the driven member is moved.

7. The driving apparatus according to claim 1, wherein the driving signal control circuit applies the second driving signal only in the prescribed interval immediately after the driven member has been moved.

8. The driving apparatus according to claim 2, wherein the driving signal control circuit applies the second driving signal only in the prescribed interval immediately after the driven member has been moved.

9. An optical apparatus, comprising the driving apparatus according to claim 1,
wherein an optical element is linked with the driven member, and vibration prevention control is performed in which the optical element is moved in a direction perpendicular to an optical axis direction.

10. The driving apparatus according to claim 1, wherein the second signal is applied to cause the driving member to be in the vibration-arrested state by making the electromechanical transducer perform the expansion/contraction motion at the same speed.

11. The optical apparatus according to claim 9, wherein the second signal is applied to cause the driving member to be in the vibration-arrested state by making the electromechanical transducer perform the expansion/contraction motion at the same speed.

12. A driving signal control circuit, which applies a driving signal to an electromechanical transducing element, which undergoes expansion/contraction motion by the driving signal, comprising:
a pulse generation circuit which generates a first driving signal applied when a driven member is to be moved, and a second driving signal applied when the driven member is not to be moved,
wherein the second driving signal is a signal for which an interval from a forward-direction charging timing to a reverse-direction charging timing of the electromechanical transducing element, and an interval from the reverse-direction charging timing to the next forward-direction charging timing, are the same.

13. The driving signal control circuit according to claim 12, wherein the first driving signal comprises a first pulse signal and a second pulse signal, and the second driving signal comprises the first pulse signal and a pulse signal obtained by delaying the second pulse signal by a time equal to substantially half the period of the first pulse signal.

14. The driving signal control circuit according to claim 12, wherein the driving signal control circuit applies the second driving signal for a prescribed interval immediately before the driven member is moved, and for a prescribed interval immediately after the driven member has been moved.

15. The driving signal control circuit according to claim 12, wherein the driving signal control circuit applies the second driving signal such that the number of pulses of the second driving signal applied in the prescribed interval immediately after the driven member has been moved is greater than the number of pulses of the second driving signal applied in the prescribed interval immediately before the driven member is moved.

16. The driving signal control circuit according to claim 12, wherein the driving signal control circuit applies the second driving signal only in the prescribed interval immediately after the driven member has been moved.

17. The driving signal control circuit according to claim 13, wherein the driving signal control circuit applies the second driving signal only in the prescribed interval immediately after the driven member has been moved.

18. An optical apparatus, comprising the driving signal control circuit according to claim 12,
wherein an optical element is linked with the driven member, and vibration prevention control is performed in which the optical element is moved in a direction perpendicular to an optical axis direction.

19. The driving signal control circuit according to claim 12, wherein the second signal is applied to cause the driving member to be in the vibration-arrested state by making the electromechanical transducer perform the expansion/contraction motion at the same speed.

* * * * *